US010481938B2

(12) United States Patent
Cook et al.

(10) Patent No.: US 10,481,938 B2
(45) Date of Patent: *Nov. 19, 2019

(54) SYSTEM AND METHOD FOR IMPLEMENTING NETWORK EXPERIENCE SHIFTING

(71) Applicant: CenturyLink Intellectual Property LLC, Denver, CO (US)

(72) Inventors: Charles I. Cook, Louisville, CO (US); Kevin M. McBride, Lone Tree, CO (US); Matthew J. Post, Farmerville, LA (US); William R. Walker, Monroe, LA (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 282 days.

This patent is subject to a terminal disclaimer.

(21) Appl. No.: 15/647,482

(22) Filed: Jul. 12, 2017

(65) Prior Publication Data
US 2017/0308395 A1 Oct. 26, 2017

Related U.S. Application Data

(63) Continuation-in-part of application No. 15/148,721, filed on May 6, 2016, now Pat. No. 9,733,975.
(Continued)

(51) Int. Cl.
G06F 9/455 (2018.01)
H04W 8/18 (2009.01)
(Continued)

(52) U.S. Cl.
CPC ......... G06F 9/45558 (2013.01); H04B 10/27 (2013.01); H04L 12/28 (2013.01);
(Continued)

(58) Field of Classification Search
CPC ... H04L 63/08; H04L 63/0853; H04L 63/102; H04L 63/083; H04L 2209/80;
(Continued)

(56) References Cited

U.S. PATENT DOCUMENTS 6,577,327 B1 6/2003 Rochford et al.
8,051,382 B1 11/2011 Kingdom et al.
(Continued)

FOREIGN PATENT DOCUMENTS

WO WO-03102730 A2 * 12/2003 ........... G06Q 20/206
WO WO-2014-110453 A1 7/2014
(Continued)

OTHER PUBLICATIONS

International Preliminary Report on Patentability, PCT-US2016-044867, dated Sep. 7, 2018, 10 pages.
(Continued)

Primary Examiner — Djenane M Bayard

(57) ABSTRACT

Novel tools and techniques are provided for implementing network experience shifting, and, in particular embodiments, using either a roaming or portable hypervisor associated with a user or a local hypervisor unassociated with the user. In some embodiments, a network node in a first network might receive, via a first network access device in a second network, a request from a user device to establish roaming network access, and might authenticate a user associated with the user device, the user being unassociated with the first network access device. Based on a determination that the user is authorized to access data, content, profiles, and/or software applications that are accessible via a second network access device, the network node might establish a secure private connection through a hypervisor or container communicatively coupled to the first network
(Continued)

access device to provide the user with access to her data, content, profiles, and/or software applications.

32 Claims, 9 Drawing Sheets

Related U.S. Application Data

(60) Provisional application No. 62/299,346, filed on Feb. 24, 2016, provisional application No. 62/172,359, filed on Jun. 8, 2015, provisional application No. 62/159,788, filed on May 11, 2015, provisional application No. 62/157,795, filed on May 6, 2015.

(51) Int. Cl.
*H04B 10/27* (2013.01)
*H04L 12/28* (2006.01)
*H04L 12/46* (2006.01)
*H04L 12/66* (2006.01)
*H04L 12/715* (2013.01)
*H04L 12/947* (2013.01)
*H04L 29/08* (2006.01)
*H04W 88/12* (2009.01)
*H04W 84/12* (2009.01)

(52) U.S. Cl.
CPC .......... *H04L 12/4641* (2013.01); *H04L 12/66* (2013.01); *H04L 45/64* (2013.01); *H04L 49/25* (2013.01); *H04L 67/02* (2013.01); *H04L 67/10* (2013.01); *H04W 8/18* (2013.01); *G06F 2009/45595* (2013.01); *H04W 84/12* (2013.01); *H04W 88/12* (2013.01)

(58) Field of Classification Search
CPC ............. H04L 63/0823; H04L 63/0892; H04L 63/126; H04L 63/0807; H04L 9/0869; H04L 9/32; H04L 63/0272; H04L 63/0876; H04L 63/18; H04L 67/306; H04L 9/0841; H04L 9/0863; H04L 9/3226; H04L 9/3247; H04L 12/66; H04L 63/0428; H04L 65/1016; H04L 67/02; H04L 12/4641; H04L 63/06; H04L 63/0815; H04L 63/0884; H04L 63/107; H04L 63/108; H04L 63/164; H04L 65/1006; H04L 65/403; H04L 67/34; H04L 9/30; H04L 12/28; H04L 41/12; H04L 45/64; H04L 49/25; H04L 67/10; H04L 43/08; H04L 67/12; H04L 69/16; H04L 12/2878; H04L 2012/4629; H04L 12/4625; H04L 29/06224; H04L 41/0823; H04L 41/0896; H04L 41/5054; H04L 41/5096; H04L 49/354; H04L 65/103; H04L 67/141; H04L 12/4633; G06F 9/45558; G06F 2009/45595; G06F 9/5077; G06F 9/50; G06F 2009/45591; G06F 9/45533; G06F 2009/45583; G06F 9/5016; G06F 8/10; G06F 8/20; G06F 11/30; G06F 11/3006; G06F 11/3433; G06F 13/102; G06F 13/4072; G06F 13/4282; G06F 2009/45579; G06F 2201/815; G06F 2209/503; G06F 2209/504; G06F 2209/508; G06F 9/4881; G06F 9/5038; G06F 3/04817; G06F 3/0482; G06F 3/0486
See application file for complete search history.

(56) References Cited

U.S. PATENT DOCUMENTS

| | | |
|---|---|---|
| 8,462,632 B1 | 6/2013 | Vincent |
| 8,717,895 B2 | 5/2014 | Koponen et al. |
| 9,141,416 B2 | 9/2015 | Bugenhagen |
| 9,158,565 B2 | 10/2015 | Jakoljevic et al. |
| 9,733,975 B2 | 8/2017 | Cook et al. |
| 2004/0015966 A1 | 1/2004 | Macchiano et al. |
| 2005/0144288 A1 | 6/2005 | Liao |
| 2006/0184998 A1 | 8/2006 | Smith |
| 2006/0224669 A1 | 10/2006 | Wouhaybi |
| 2006/0236095 A1 | 10/2006 | Smith |
| 2007/0014306 A1 | 1/2007 | Tirri |
| 2007/0115962 A1 | 5/2007 | Mammoliti |
| 2007/0124406 A1 | 5/2007 | Liu |
| 2007/0230358 A1 | 10/2007 | Narayanan et al. |
| 2008/0002676 A1 | 1/2008 | Wiley |
| 2008/0025321 A1 | 1/2008 | Gudipudi |
| 2008/0043640 A1 | 2/2008 | Smith |
| 2008/0049927 A1 | 2/2008 | Wiley |
| 2008/0155423 A1 | 6/2008 | Moran |
| 2008/0155537 A1 | 6/2008 | Dinda et al. |
| 2009/0092151 A1 | 4/2009 | Raguet et al. |
| 2009/0187654 A1 | 7/2009 | Raja et al. |
| 2009/0290595 A1 | 11/2009 | Celebioglu |
| 2009/0292858 A1 | 11/2009 | Lambeth et al. |
| 2010/0023623 A1 | 1/2010 | Saffre et al. |
| 2010/0080238 A1 | 4/2010 | Allan |
| 2010/0122334 A1 | 5/2010 | Stanzione et al. |
| 2010/0149999 A1 | 6/2010 | Beattie |
| 2010/0162238 A1 | 6/2010 | Warfield |
| 2010/0169780 A1 | 7/2010 | Bryant-Rich |
| 2010/0177642 A1 | 7/2010 | Sebastian |
| 2010/0192152 A1 | 7/2010 | Miyamoto et al. |
| 2011/0209157 A1 | 8/2011 | Sumida et al. |
| 2011/0222412 A1 | 9/2011 | Kompella |
| 2011/0231551 A1 | 9/2011 | Hassan et al. |
| 2011/0252418 A1 | 10/2011 | Havivi et al. |
| 2011/0276951 A1 | 11/2011 | Jain |
| 2011/0296234 A1 | 12/2011 | Oshins et al. |
| 2011/0314469 A1 | 12/2011 | Qian et al. |
| 2011/0317678 A1 | 12/2011 | Allan et al. |
| 2012/0072564 A1 | 3/2012 | Johnsen |
| 2012/0072909 A1 | 3/2012 | Malik et al. |
| 2012/0167083 A1 | 6/2012 | Suit |
| 2012/0174099 A1 | 7/2012 | Ashok et al. |
| 2012/0233350 A1 | 9/2012 | Unbehagen |
| 2012/0304175 A1 | 11/2012 | Damola et al. |
| 2012/0331461 A1 | 12/2012 | Fries et al. |
| 2013/0003538 A1 | 1/2013 | Greenberg et al. |
| 2013/0031543 A1 | 1/2013 | Angus |
| 2013/0058215 A1 | 3/2013 | Koponen et al. |
| 2013/0061297 A1 | 3/2013 | Larsen et al. |
| 2013/0191850 A1 | 7/2013 | Fischer et al. |
| 2013/0204971 A1 | 8/2013 | Brandywine et al. |
| 2013/0212600 A1 | 8/2013 | Harsh et al. |
| 2013/0275968 A1 | 10/2013 | Petev et al. |
| 2013/0332926 A1 | 12/2013 | Jakoljevic et al. |
| 2014/0016924 A1 | 1/2014 | Gonzalez |
| 2014/0112349 A1 | 4/2014 | Moreno |
| 2014/0123140 A1 | 5/2014 | Motoki |
| 2014/0164618 A1 | 6/2014 | Alicherry et al. |
| 2014/0201374 A1 | 7/2014 | Ashwood-Smith |
| 2014/0282528 A1 | 9/2014 | Bugenhagen |
| 2014/0282529 A1 | 9/2014 | Bugenhagen |
| 2014/0317293 A1 | 10/2014 | Shatzkamer |
| 2014/0321260 A1 | 10/2014 | Mishra et al. |
| 2014/0321298 A1 | 10/2014 | Chow |
| 2014/0347979 A1 | 11/2014 | Tanaka |
| 2015/0049601 A1 | 2/2015 | Bugenhagen |
| 2015/0052600 A1 | 2/2015 | Weinsberg |
| 2015/0109995 A1* | 4/2015 | Mathai ................ H04L 61/1511 370/328 |
| 2015/0117454 A1 | 4/2015 | Koponen et al. |
| 2015/0143368 A1 | 5/2015 | Bugenhagen |
| 2015/0207699 A1 | 7/2015 | Fargano et al. |
| 2015/0212856 A1 | 7/2015 | Shanmuganathan et al. |

(56) References Cited

U.S. PATENT DOCUMENTS

| | | |
|---|---|---|
| 2015/0256357 A1 | 9/2015 | Rajendran |
| 2015/0263946 A1 | 9/2015 | Tubaltsev |
| 2015/0288541 A1 | 10/2015 | Fargano et al. |
| 2015/0288622 A1 | 10/2015 | Fargano et al. |
| 2015/0288767 A1 | 10/2015 | Fargano et al. |
| 2015/0295750 A1 | 10/2015 | Blanco |
| 2015/0324220 A1 | 11/2015 | Bugenhagen |
| 2016/0006696 A1 | 1/2016 | Donley et al. |
| 2016/0044035 A1 | 2/2016 | Huang |
| 2016/0048403 A1 | 2/2016 | Bugenhagen |
| 2016/0050159 A1 | 2/2016 | Cook et al. |
| 2016/0329965 A1 | 11/2016 | Cook et al. |
| 2016/0330074 A1 | 11/2016 | Cook et al. |
| 2016/0330140 A1 | 11/2016 | Cook et al. |
| 2016/0330613 A1 | 11/2016 | Cook et al. |
| 2016/0335111 A1 | 11/2016 | Bruun |
| 2016/0337206 A1 | 11/2016 | Bugenhagen et al. |
| 2017/0034763 A1 | 2/2017 | Reddy et al. |
| 2017/0111221 A1 | 4/2017 | Chouhan |
| 2017/0311244 A1* | 10/2017 | Kodaypak ............. H04W 48/18 |
| 2018/0248973 A1 | 8/2018 | Cook et al. |
| 2019/0028573 A1 | 1/2019 | Cook et al. |

FOREIGN PATENT DOCUMENTS

| | | |
|---|---|---|
| WO | WO-2014-150715 A1 | 9/2014 |
| WO | WO-2015-077460 A1 | 5/2015 |
| WO | WO-2016-025497 A1 | 2/2016 |
| WO | WO-2016-025501 A1 | 2/2016 |
| WO | WO-2017-146768 A1 | 8/2017 |

OTHER PUBLICATIONS

Broadband Access Service Attributes and Performance Metrics, Broadband Forum Feb. 2015, 51 pages.

LightReading (Mar. 17, 2015). "RAD Launches vCPE Platform for Hosting VNFs." Web Site www.lightreading.com/nfv/nfv-elements/rad-launches-vcpe-platform-for-hosting-vnfs. Accessed Sep. 8, 2015, 1 page.

Gowan, Bo. (Jun. 22, 2015) "Ciena unveils a carrier-grade CPE for NFV." Web Site www.ciena.com/connect/blog/Ciena-unveils-a-carrier-grade-CPE-for-NFV.html. Accessed Sep. 8, 2015, 4 pages.

U.S. Appl. No. 15/148,721; Ex Parte Quayle Action dated Mar. 13, 2017; 39 pages.

Henrik Basilier et al. Ericsson Review. Virtualizing network services—the telecom cloud, Mar. 28, 2014, Retrieved from the Internet: <http://www.ericsson.com/res/thecompany/docs/publications/ericssor_review/2014/er-telecom-cloud.pdf> ISSN 0014-0171. pp. 1-9.

International Application No. PCT/US2014/024050; International Preliminary Report on Patentability dated Sep. 24, 2015; 6 pages.

International Application No. PCT/US2014/024050; Published Application dated Sep. 25, 2014; 55 pages.

International Application No. PCT/US2014/066628; Notification Concerning Availability of the Publication of the International Application dated May 28, 2015; 1 page.

International Application No. PCT/US2015/044682; International Search Report and Written Opinion dated Nov. 16, 2015; 13 pages.

International Application No. PCT/US2015/044690; International Search Report and Written Opinion dated Dec. 4, 2015; 12 pages.

International Search Report and Written Opinion prepared by the Korean Intellectual Property Office as International Searching Authority for PCT Intl Patent App. No. PCT/US2014/024050 dated Jun. 27, 2014; 9 pages.

International Search Report and Written Opinion prepared by the Korean Intellectual Property Office as International Searching Authority for PCT Intl Patent App. No. PCT/US2014/066628 dated Mar. 10, 2015; 10 pages.

International Search Report and Written Opinion prepared by the Korean Intellectual Property Office as International Searching Authority for PCT Intl Patent App. No. PCT/US2016/044867 dated Nov. 23, 2016; 13 pages.

Publication Notice of PCT Intl Patent App. No. PCT/US2014/024050 dated Sep. 25, 2014; 1 page.

Stuart Clayman et al. 'The Dynamic Placement of Virtual Network Functions.' In: 2014 IEEE Network Operations and Management Symposium (NOMS), May 5-9, 2014, pp. 1-9.

U.S. Appl. No. 14/060,450; Final Rejection dated May 21, 2015; 20 pages.

U.S. Appl. No. 14/060,450; Non-Final Rejection dated Feb. 12, 2015; 33 pages.

U.S. Appl. No. 14/061,147; Issue Notification dated Sep. 2, 2015; 1 page.

U.S. Appl. No. 14/061,147; Non-Final Rejection dated Dec. 19, 2014; 29 pages.

U.S. Appl. No. 14/061,147; Notice of Allowance and Interview Summary dated Apr. 29, 2015; 29 pages.

U.S. Appl. No. 14/460,085; Non-Final Rejection dated Feb. 22, 2016; 28 pages.

U.S. Appl. No. 14/531,000; Final Rejection dated May 2, 2016; 23 pages.

U.S. Appl. No. 14/531,000; Non-Final Rejection dated Jan. 29, 2016; 30 pages.

U.S. Appl. No. 14/583,952; Non-Final Rejection dated Mar. 28, 2016; 32 pages.

U.S. Appl. No. 15/148,721; Notice of Allowance dated Apr. 13, 2017; 14 pages.

\* cited by examiner

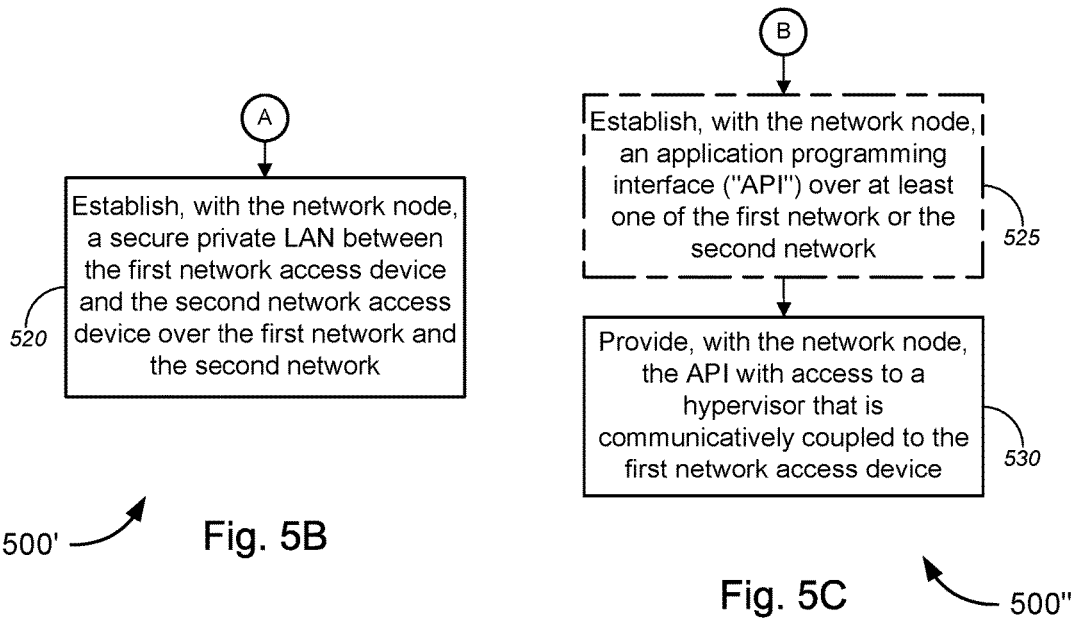
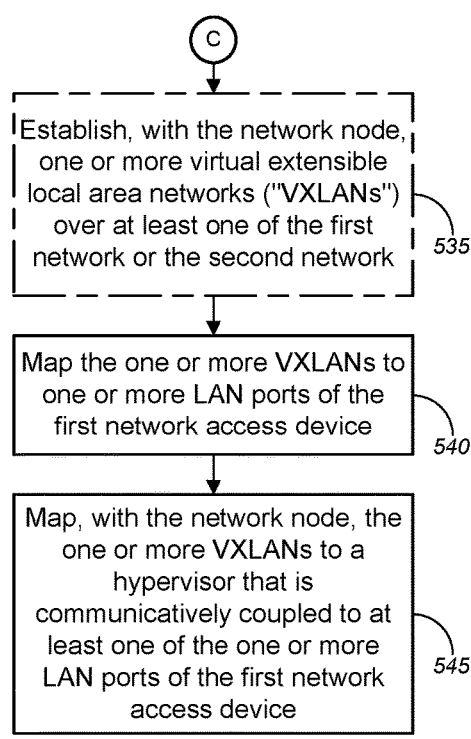
Fig. 5B  
Fig. 5C  
Fig. 5D

SYSTEM AND METHOD FOR IMPLEMENTING NETWORK EXPERIENCE SHIFTING

CROSS-REFERENCES TO RELATED APPLICATIONS

This application is a continuation-in-part of U.S. patent application Ser. No. 15/148,721 filed May 6, 2016 by Charles I. Cook et al. and titled, "System and Method for Implementing Network Experience Shifting", which claims priority to U.S. Patent Application Ser. No. 62/157,795 (the "'795 application"), filed May 6, 2015 by Charles I. Cook et al. and titled, "NFVI Enhanced Open Business/Residential Gateways and Customer Portal", U.S. Patent Application Ser. No. 62/159,788 (the "'788 application"), filed May 11, 2015 by Charles I. Cook et al. and titled, "NFVI Enhanced Open Business/Residential Gateways and Customer Portal", U.S. Patent Application Ser. No. 62/172,359 (the "'359 application"), filed Jun. 8, 2015 by Charles I. Cook et al. and titled, "Enhanced LAN With Customer Portal Control", and U.S. Patent Application Ser. No. 62/299,346 (the "'346 application"), filed Feb. 24, 2016 by Charles I. Cook et al. and titled, "Experience Shifting".

This application may be related to U.S. patent application Ser. No. 15/148,688 (the "'688 application"), filed May 6, 2016 by Charles I. Cook et al. and titled, "System and Method for Implementing Network Enhanced Gateway Functionality", U.S. patent application Ser. No. 15/148,705 (the "'705 application"), filed May 6, 2016 by Charles I. Cook et al. and titled, "System and Method for Implementing Extension of Customer LAN at Provider Network Service Point", and U.S. patent application Ser. No. 15/148,711 (the "'711 application"), filed May 6, 2016 by Charles I. Cook et al. and titled, "System and Method for Implementing Isolated Service Overlays between Provider Network Service Point and Customer Premises", each of which claims priority to the '795, '788, and '359 applications.

This application may be related to U.S. patent application Ser. No. 14/678,208 (the "'208 application"), filed Apr. 3, 2015 by Michael J. Fargano et al. and titled, "Network Functions Virtualization Interconnection Gateway", which claims priority to U.S. Patent Application Ser. No. 61/974,927, filed Apr. 3, 2014 by Michael J. Fargano and titled, "Network Functions Virtualization Interconnection Gateway"; U.S. patent application Ser. No. 14/678,280 (the "'280 application"), filed on Apr. 3, 2015 by Michael J. Fargano et al. and titled, "Network Functions Virtualization Interconnection Hub", which claims priority to U.S. Patent Application Ser. No. 61/974,930, filed Apr. 3, 2014 by Michael J. Fargano and titled, "Network Functions Virtualization Interconnection Hub"; U.S. patent application Ser. No. 14/678,309 (the "'309 application"), filed Apr. 3, 2015 by Michael J. Fargano et. al and titled, "Customer Environment Network Functions Virtualization (NFV)", which claims priority to U.S. Patent Application Ser. No. 61/976,896, filed Apr. 8, 2014 by Michael J. Fargano and titled, "Customer Environment Network Functions Virtualization (NFV)" and U.S. Patent Application Ser. No. 61/977,820, filed Apr. 10, 2014 by Michael J. Fargano and titled, "Customer Environment Network Functions Virtualization (NFV)"; U.S. patent application Ser. No. 14/730,695 (the "'695 application"), filed Jun. 4, 2015 by Charles I. Cook et al. and titled, "Remoting Application Servers", which claims priority to U.S. Patent Application Ser. No. 62/037,096, filed Aug. 13, 2014 by Charles I. Cook et al. and titled, "Remoting Application Servers"; and U.S. patent application Ser. No. 14/983,884 (the "'884 application"), filed Dec. 30, 2015 by Kevin M. McBride et al. and titled, "Intent-Based Services Orchestration", which claims priority to U.S. Patent Application Ser. No. 62/233,911, filed Sep. 28, 2015 by Kevin M. McBride et al. and titled, "Intent-Based Services Orchestration" and U.S. Patent Application Ser. No. 62/247,294, filed Oct. 28, 2015 by Kevin M. McBride et al. and titled, "Intent-Based Services Orchestration"; and U.S. patent application Ser. No. 14/983,758 (the "'758 application"), filed Dec. 30, 2015 by Michael K. Bugenhagen and titled, "Virtual Machine-To-Port Peripheral Device Driver", which claims priority to U.S. Patent Application Ser. No. 62/237,981, filed Oct. 6, 2015 by Michael K. Bugenhagen and titled, "NFV Peripheral Network Driver for VNF's".

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing network experience shifting, and, in particular embodiments, to methods, systems, apparatuses, and computer software for implementing network experience shifting using portable or external hypervisors associated with a user.

BACKGROUND

Consumers today are very much accustomed to having personalized settings on their devices, including personalized smart phone settings, personalized tablet settings, personalized physical activity tracking settings, personalized computer desktop/laptop settings, etc. In some cases, consumers might also have personalized network settings for their home networks and/or for their work networks. When a customer travels to a different location that is not associated with the customer (e.g., hotel, overseas, friend's house, etc.), the customer might still have access to his or her personalized smart phone settings by bringing his or her smart phone, access to his or her personalized tablet settings by bringing his or her tablet, access to his or her physical activity tracking settings by bringing his or her physical activity tracking device, access to his or her personalized computer desktop/laptop settings by bringing his or her laptop computer, but would conventionally not have access to network settings or network-related settings, or the like, without implementing complicated steps (or at least involving significant user input) to establish virtual private networks or the like.

Hence, there is a need for more robust and scalable solutions for implementing network experience shifting, and, in particular embodiments, to methods, systems, apparatuses, and computer software for implementing network experience shifting using portable or external hypervisors associated with a user, and, in other embodiments, to methods, systems, apparatuses, and computer software for implementing network experience shifting using hypervisors that are unassociated with the user.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 5A-5D are flow diagrams illustrating another method for implementing network experience shifting, in accordance with various embodiments.

DETAILED DESCRIPTION OF CERTAIN EMBODIMENTS

Overview

Figure 1:
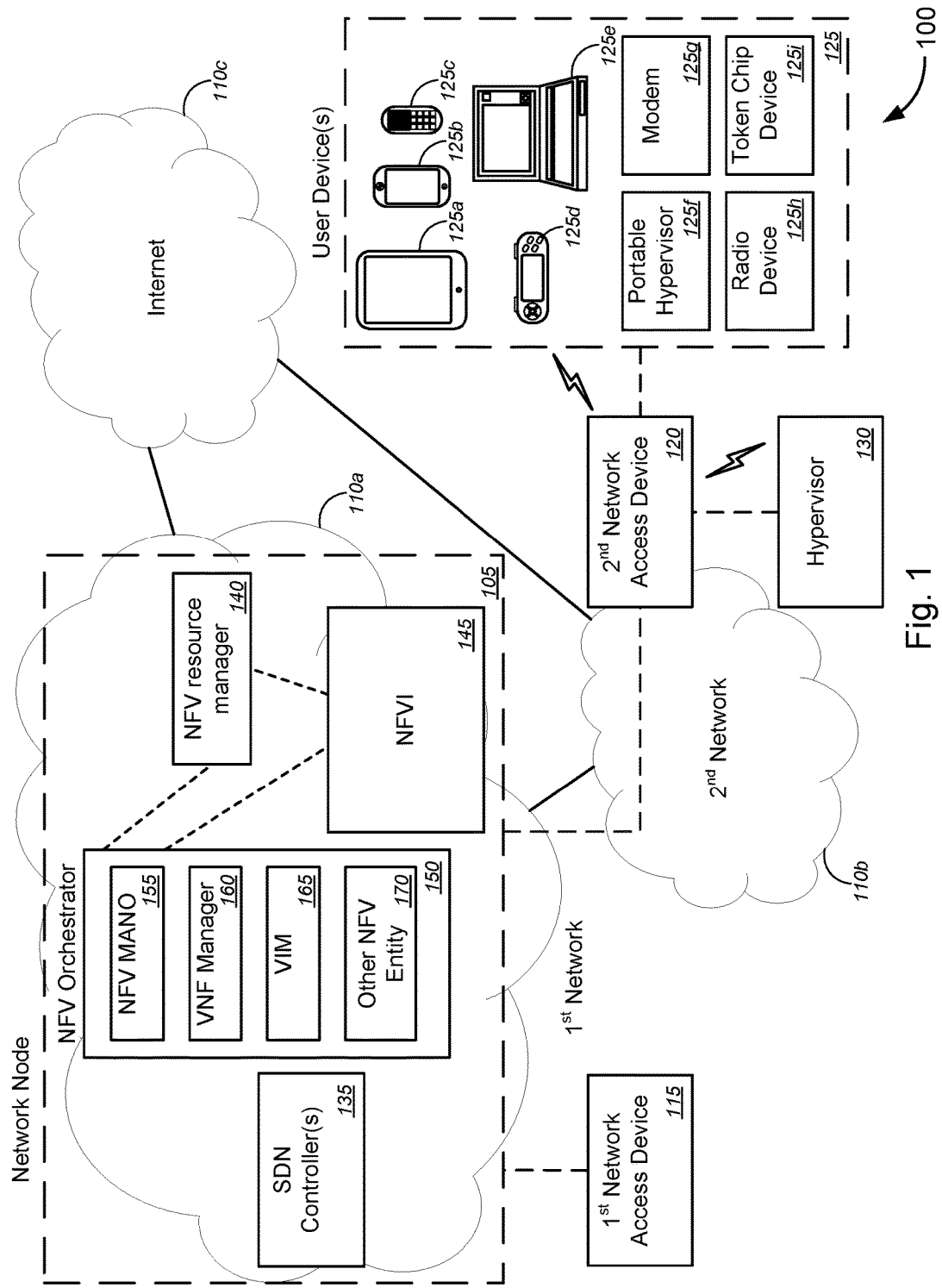
FIG. 1 is a schematic diagram illustrating a system for implementing network experience shifting, in accordance with various embodiments.

Various embodiments provide tools and techniques for implementing network experience shifting, and, in particular embodiments, to methods, systems, apparatuses, and computer software for implementing network experience shifting using either a roaming or portable hypervisor associated with a user or a local hypervisor (also referred to as a "roamed-to hypervisor" or the like) that is unassociated with the user.

In various embodiments, a network node in a first network might receive, via a first network access device in a second network, a request from a user device to establish roaming network access, and might authenticate a user associated with the user device, the user being unassociated with the first network access device. Based at least in part on a determination that the user is authorized to access data, content, profiles, software applications, virtual network functions ("VNFs"), and/or subscribed-to services that are accessible via a second network access device with which the user is associated, the network node might establish a secure private connection through a hypervisor communicatively coupled to the first network access device to provide the user with access to his or her data, content, profiles, software applications, VNFs, and/or subscribed-to services.

According to some embodiments, authenticating the user might include at least one of the following: (a) determining whether the user is associated with the second network access device and determining whether the user is authorized to access at least one of data, content, profiles, software applications (or "apps"), VNFs, and/or subscribed-to services that are accessible by the second network access device (i.e., that are accessible by the user through or from the second network access device, or the like); (b) establishing a communication link between the hypervisor (i.e., a roaming or portable hypervisor that is associated with the user, the user being unassociated with the first network access device) and the second network access device via the network node and authenticating the hypervisor using the second network access device, the network node, or both; (c) establishing a communication link (either via wired communication and/or via wireless communication) with a portal (e.g., a web portal or the like), sending authentication information to the portal from at least one of the user or the user device, and authenticating, via the portal (i.e., either by the portal itself, a server running the portal, a server associated with the portal, and/or the like), the user based on the authentication information from the at least one of the user or the user device.

In some embodiments, establishing the secure private connection through the hypervisor might comprise at least one of the following: (i) pushing one or more virtual network functions ("VNFs") to the hypervisor (which may be associated with the user or may be unassociated with the user) that is in communication with the first network access device and executing instances of the VNFs on the hypervisor; (ii) establishing a secure private LAN between the first network access device and the second network access device over the first and second networks; (iii) establishing an application programming interface ("API") over at least one of the first network or the second network and providing the API with access to the hypervisor that is communicatively coupled to the first network access device; (iv) establishing one or more VXLANs over at least one of the first network or the second network, map the one or more VXLANs to the hypervisor that is communicatively coupled to at least one of one or more LAN ports of the first network access device, and map the one or more VXLANs to the one or more LAN ports of the first network access device; (v) using network service headers ("NSH"), which is agnostic to transport media and is compatible with various transport protocols or (e.g., VXLAN protocols, multiprotocol label switching ("MPLS") protocols, etc.), for routing of VNFs to the roamed-to hypervisor or to the portable hypervisor; and/or the like.

In some cases, the network node might include, without limitation, one of a gateway device, a network switch, a network functions virtualization ("NFV") entity, or a software defined network ("SDN") controller, wherein the NFV entity might comprise at least one of a NFV resource manager, a network functions virtualization infrastructure ("NFVI") system, a NFV orchestrator, a NFV management and orchestration ("MANO") system, a VNF manager, a virtualized infrastructure manager ("VIM"), or some other NFV entity, which might include a virtual machine ("VM"), a macro orchestrator, or a domain orchestrator, and/or the like. In some cases, the first network and the second network might be associated with the same network service provider. Alternatively, the first network and the second network might be associated with different network service providers. In some cases, the first network and the second network might each communicatively couple to the Internet. Each of the first network access device and the second network access device, in some embodiments, might include, but is not limited to, at least one of a customer premises equipment ("CPE"), a router, a switch, a network element, a demarcation device, a WiFi gateway device, a hypervisor platform, one or more virtual machine-based host machines, and/or the like. The CPE, in some instances, might include, without limitation, at least one of an optical network terminal ("ONT"), a network interface device ("NID"), an enhanced NID ("eNID"), a residential gateway ("RG") device, a business gateway ("BG") device, or a virtual gateway ("vG") device, and/or the like.

In some instances, the user devices might include, without limitation, one of a tablet computer, a smart phone, a mobile phone, a portable gaming device, a laptop computer, a portable hypervisor, a modem, a radio device, or a token chip device, and/or the like. The hypervisor, which might comprise a compute resource, a memory, and a storage, and/or the like, might be one of integrated with the first network access device, communicatively coupled to a host port of the first network access device, communicatively coupled to a universal serial bus ("USB") port of the first network access device, communicatively coupled to a local area network ("LAN") port of the first network access device, or communicatively coupled to a communication port of the first network access device that is different from any of the host port, the USB port, and the LAN port, and/or the like.

In a non-limiting example, user might carry a token chip device or a smart phone when travelling to a different part of the country or to a different country on vacation or on a business trip. The token chip device or the smart phone might autonomously and automatically establish a wireless link to the local network access device (whether at a hotel, in a hotel room, at a business premises that may be associated with the user's employer or may be associated with a client or potential client, in a local coffee shop, in a local restaurant, etc.), and might automatically establish at least one of a secure private LAN, one or more VXLANS, and/or an API, to provide secure and private access to the user's data, content, profiles, apps, VNFs, and/or subscribed-to services to the user either via a local or roamed-to hypervisor that is communicatively coupled to the local network access device or via a roaming or portable hypervisor that the user also carries along. In alternative embodiments, the network node might push one or more VNFs to either the roamed-to hypervisor or the roaming hypervisor, and might execute instances of the VNFs on such hypervisor, to establish the at least one of a secure private LAN, one or more VXLANS, and/or an API, and/or to otherwise provide the user with secure and private access to the user's data, content, profiles, apps, VNFs, and/or subscribed-to services via such hypervisor. In yet another alternative set of embodiments, a VNF that simulates the functions of a hypervisor (referred to herein as "hypervisor VNF," which is distinct from other VNFs that can be executed on a hypervisor) might be pushed to a user device or a local network node/gateway, thereby enabling service portability over a roamed-to network even if the roamed-to network does not support hypervisors. In some instances, the hypervisor or hypervisor VNF could be located deeper in the roamed-to network than the access node (i.e., closer to the core of the network than the network access device, or the like). In many cases, being closer to the user device is better because of performance attributes like lower latency, or the like. Initially, however, some implementations may start out being hosted on centralized servers, then subsequently pushed closer to the customers (i.e., to the access networks, gateways, etc.) as economics and demand dictate. In still another alternative set of embodiments, the user can carry copies of VNFs with him or her when roaming to run on the portable hypervisor on his or her user device, or the user can tunnel back to his or her home LAN to retrieve copies of VNFs, or the user can access a library (which may be located in various network locations, in cloud storage, or the like) that has copies of the VNFs that he or she has subscribed to.

In an alternative example, the user might connect to a visited network access device (whether at a hotel, in a hotel room, at a business premises that may be associated with the user's employer or may be associated with a client or potential client, in a local coffee shop, in a local restaurant, etc.), and might log into a portal (e.g., web portal, app portal, or the like), and might follow the subsequent prescribed steps to authenticate himself or herself. Upon authentication of the user, a service provider associated with the portal might then push subscribed-to VNFs or the like to the visited location and instantiate the VNFs on the local hypervisor (which might be integrated in the visited network access device or externally connected to the visited network access device). Alternatively, the user or subscriber may pull subscribed-to VNFs. The push method would be more automatic and would require less interaction with the user device. In these examples, the network access device and/or the hypervisor might be part of or linked to a kiosk, a shared work location, a friend's house, etc., and thus are unassociated with the user.

In another non-limiting example, a user might go to a coffee shop or a hotel room. The user's user device (e.g., smart phone, token device, etc.) wirelessly connects with the local LAN, connects with the user's home or work LAN, provides authentication for the user to access the user's home or work LAN, and automatically sets up a secure private LAN without the user having to do anything. In some cases, this can be implemented using software on the user's phone or device (e.g., iPhone, Android phone, etc.), while in other cases, an external/visiting/portable hypervisor might be used. In yet another alternative example, the user might carry a token chip or the like that performs similar functionality; in some cases, the token chip merely signals the presence of the user, while other devices and codes associated with the user initiate and establish the connection and authentication.

According to another set of embodiments, the user may be able to access at least one of data, content, profiles, apps, VNFs, and/or services via the roamed-to hypervisor, the roaming hypervisor, or a local network device running a pushed or pulled hypervisor VNF, or the like, using the techniques described herein. As to services being portable in this manner, an example might include a user plugging his or her user device into a port somewhere away from his or her home/work LAN (e.g., a port on a LAN in a neighbor's house, a port on a LAN hotel/motel/resort, a port on a LAN at a conference venue, a port on a public LAN, etc.). In the case of the neighbor's LAN being accessed, the neighbor may not subscribe to the same bandwidth or service level agreement. However, when the user device is attached or coupled to the neighbor's network, the user device can authenticate with an appropriate authentication server that will instruct the network to configure the access network to deliver the access service in accordance with the user's profile, subject to physical limitations of the access technology that the neighbor may have—e.g., the neighbor may be served by an xDSL technology that does not have the capability to provide the 1 Gbps service that the user may have subscribed to on a fiber network, etc. Depending on the user's SLA, there may be additional billing associated with reconfiguring the neighbor's network for the user. When the user removes his or her device from the neighbor's network, the network automatically reverts to the neighbor's access service profile. In a similar manner, public access networks (e.g., public LAN in a hotel/motel/resort, public LAN at a conference venue, other public LAN, etc.) can be reconfigured in like manner to provide the user with subscribed-to network service on the public-access network (subject to any physical limitations of the access technology of the public-access network). For such public LAN, reconfiguration of the network might also include establishing secure connections to turn the public LAN into a private LAN (e.g., VPN, etc.). When the user removes his or her device from the public access network, the network automatically reverts to its previous settings and configurations.

In the event that the roamed-to network is not capable of providing all the features and capabilities that the subscriber has subscribed to, the network may provide an indication of those limitations to the subscriber. This may be communicated through a web portal or other means of communication (including, but not limited to, e-mail, SMS, text message, etc.). A more advanced roamed-to system may also communicate options/recommendations on actions that the subscriber may be able to take in order to mitigate service deficiencies of the roamed-to network. For example, in the case of a bandwidth deficiency, the network may provide an option/recommendation for the subscriber to modify priority levels while connected to the roamed-to network. Another example might be to swap out a full-featured VNF requiring more resources for a reduced feature-set VNF that requires fewer resources (yet provides the subscriber with services up to the capability of the roamed-to network). Also, in addition to the services profile that the subscriber has, a contingency profile(s) might be provided that would contain sets of actions to take automatically should a deficiency be detected on the roamed-to network so that the subscriber does not have to manually execute those actions. Any changes from the original profile that get implemented based on a contingency profile(s) can be communicated to the subscriber by any appropriate means (e.g., web interface, e-mail, SNS, text message, etc.).

In the examples above, the user can be provided with access to his or her personalized network settings for his or her home network and/or for his or her work network—as well as access to his or her data, content, profiles, and/or software applications—, without doing anything (except, of course, carrying his or her user device and/or, in some cases, his or her portable hypervisor). Like in a cellular mobile network, a mobile or portable device (e.g., portable hypervisor, a device that has an integrated hypervisor, a device that has a detachable hypervisor, a device with a virtual hypervisor, or the like) a roam from one location to another without specific interaction with the user. If the mobile or portable device has previously visited a new network, the network may be able to partially or fully automate the authentication process, depending on the degree of secure identification information that is present.

According to various embodiments, in addition to, or alternative to, the use of hypervisors or portable hypervisors, containers may be used. Containers typically consume fewer resources than a VNF on a VM on a hypervisor. In some cases, a container can contain the VNF and only the resources needed to run the VNF, rather than a complete operating system. Herein, unless otherwise indicated, operations performed by a hypervisor or portable hypervisor may alternatively be performed by a container.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network configuration technology, network access technology, virtualized network function technology, portable hypervisor technology, and/or the like. In other aspects, certain embodiments, can improve the functioning of user equipment or systems themselves (e.g., telecommunications equipment, network equipment, local hypervisors, portable hypervisors, network nodes, etc.), for example, by establishing a secure private connection through a hypervisor communicatively coupled to a local or visited network access device to provide a user with access to his or her data, content, profiles, and/or software applications from his or her home or work network devices, based at least in part on a determination that the user is authorized to access data, content, profiles, and/or software applications that are accessible via a home or work network access device with which the user is associated; by pushing one or more virtual network functions ("VNFs") to the hypervisor (which may be associated with the user or may be unassociated with the user) that is in communication with the local or visited network access device and executing instances of the VNFs on the hypervisor; by establishing a secure private LAN between the local or visited network access device and the home or work network access device over first and second networks; by establishing an application programming interface ("API") over at least one of the first network or the second network and providing the API with access to the hypervisor that is communicatively coupled to the local or visited network access device; by establishing one or more VXLANs over at least one of the first network or the second network, map the one or more VXLANs to the hypervisor that is communicatively coupled to at least one of one or more LAN ports of the first network access device, and map the one or more VXLANs to the one or more LAN ports of the first network access device; and/or the like.

In particular, to the extent any abstract concepts are present in the various embodiments, those concepts can be implemented as described herein by devices, software, systems, and methods that involve specific novel functionality (e.g., steps or operations), such as improving the functionality of the network components or equipment (e.g., the hypervisor, the network node, or the like), improving access of the network itself along with access of data, content, profiles, and/or software applications through the network, and/or the like, to name a few examples, that extend beyond mere conventional computer processing operations. These functionalities can produce tangible results outside of the implementing computer system, including, merely by way of example, ability for the user to access his or her home/ work network settings and profiles even when travelling to a different location (e.g., overseas, a different part of the country, a friend's house, etc.) without having to do anything, ability for the user to access his or her data, content, profiles, software applications, VNFs, and/or subscribed-to services—which might be located on the user's home/work LAN, in the network, in cloud storage, and/or the like—even when travelling to a different location without having to do anything, and/or the like, which may be observed or measured by customers and/or service providers.

In an aspect, a method might comprise receiving, at a network node in a first network and via a first network access device in a second network, a request from a first user device to establish roaming network access. A first user of the first user device might be associated with a second network access device in the first network and might be unassociated with the first network access device. The second network access device might be located in a different geographical location from the first network access device. The method might also comprise authenticating, with the network node, the first user; determining, with the network node, whether the first user is associated with the second network access device; and determining, with the network node, whether the first user is authorized to access at least one of data, content, profiles, software applications, one or more first virtual network functions ("VNFs"), or one or more subscribed-to services that are accessible by the second network access device. The method might further comprise, based on a determination that the first user is associated with the second network access device and that the first user is authorized to access at least one of data, content, profiles, software applications, one or more first VNFs, or one or more subscribed-to services that are accessible by the second network access device, providing, with the network node, one or more second VNFs to one of a hypervisor or a container that is in communication with the first network access device and executing instances of the one or more second VNFs on the one of the hypervisor or the container. The method might also comprise establishing, with the network node, access connection to a data store by executing the instances of the one or more second VNFs on the one of the hypervisor or the container, the data store containing the at least one of data, content, profiles, software applications, one or more first VNFs, or network configuration information for one or more subscribed-to services that are accessible by the second network access device.

According to some embodiments, the data store might comprise at least one of one or more databases local to a home local area network ("LAN") that is associated with the first user, one or more databases local to a work LAN that is associated with the first user, one or more databases disposed within the network node, one or more databases external yet communicatively coupled to the network node, one or more databases communicatively coupled to a profile server, a data library, a content library, a profile library, a contingency profile library, a VNF library, or a network configuration library, and/or the like.

In some embodiments, the network node might comprise one of a gateway device, a network switch, a network functions virtualization ("NFV") entity, or a software defined network ("SDN") controller, wherein the NFV entity comprises at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator, and/or the like. In some cases, the first network and the second network might be associated with the same network service provider. Alternatively, the first network and the second network might be associated with different network service providers.

According to some embodiments, the first user device and the one of the hypervisor or the container might be associated with the first user and unassociated with the first network access device or any network nodes in the second network. In some embodiments, the one of the hypervisor or the container might comprise a hypervisor, where the hypervisor and the first user device might be the same device, and might be embodied as a roaming hypervisor, and the one or more second VNFs that are provided to the roaming hypervisor might be VNFs that are already subscribed to by the first user. In some cases, the one of the hypervisor or the container might comprise a container, where the container might be embodied as a roaming device with the container, and where the roaming device and the first user device might be the same device, and the one or more second VNFs that are provided to the roaming device are VNFs that are already subscribed to by the first user. In some instances, authenticating, with the network node, the first user comprise establishing, with the one of the hypervisor or the container, a communication link with the second network access device via the network node and authenticating the one of the hypervisor or the container using one of the second network access device or the network node.

In alternative embodiments, authenticating, with the network node, the first user comprise establishing a communication link with a portal (e.g., a web portal, an authentication server, or the like), receiving, at the portal, authentication information from at least one of the first user or the first user device, and authenticating, via the portal, the first user based on the received authentication information.

In some embodiments, the one of the hypervisor or the container might comprise a compute resource, a memory, and a storage, and/or the like. In some instances, the one of the hypervisor or the container might be one of integrated with the first network access device, communicatively coupled to a host port of the first network access device, communicatively coupled to a universal serial bus ("USB") port of the first network access device, communicatively coupled to a local area network ("LAN") port of the first network access device, or communicatively coupled to a communication port of the first network access device that is different from any of the host port, the USB port, and the LAN port, and/or the like.

Merely by way of example, in some cases, the first user device might comprise one of a tablet computer, a smart phone, a mobile phone, a portable gaming device, a laptop computer, a portable hypervisor, a roaming device with a container, a modem, a radio device, or a token chip device, and/or the like. The first network access device and the second network access device, according to some embodiments, might each comprise at least one of a customer premises equipment ("CPE"), a router, a switch, a network element, a demarcation device, a WiFi gateway device, a hypervisor platform, one or more virtual machine-based host machines, a network node capable of hosting a hypervisor or a container, and/or the like. In some instances, the CPE might comprise at least one of an optical network terminal ("ONT"), a network interface device ("NID"), an enhanced NID ("eNID"), a residential gateway ("RG") device, a business gateway ("BG") device, a virtual gateway ("vG") device, an integrated cable modem/gateway, an integrated radio/gateway, or an integrated transceiver gateway device, and/or the like. The CPE can be based on any of optical, copper, or wireless communications technologies.

In some embodiments, the request from the first user device may be automatically sent from the first user device via the first network access device, without user input from the first user. In such cases, the first user device and the first network access device might communicate with each other using at least one of machine-to-machine ("M2M") communication, M2M protocols, Internet of Things ("IoT") communication, IoT protocols, or IoT proxy functions, and/or the like.

In some instances, receiving the request from the first user device to establish roaming network access might comprise receiving, at the network node, the request from the first user device to establish roaming network access via the first network access device and via a docking station that is communicatively coupled to the first network access device. According to some embodiments, the method might further comprise, based on a determination that the first user is associated with the second network access device and that the first user is authorized to access at least one of data, content, profiles, software applications, one or more first VNFs, or one or more subscribed-to services that are accessible by the second network access device, establishing, with the network node, a secure private LAN between the first network access device and the second network access device over the first network and the second network. Alternatively, or additionally, the method might further comprise providing, with the network node, an application programming interface ("API") with access to the one of the hypervisor or the container over the at least one of the first network or the second network. In another alternative or additional embodiment, the method might further comprise mapping, with the network node, one or more virtual extensible local area networks ("VXLANs") to the one of the hypervisor or the container. In some cases, mapping one or more VXLANs to the one of the hypervisor or the container might comprise mapping one or more VXLANs to one or more LAN ports of the first network access device, where the one of the hypervisor or the container is communicatively coupled to at least one of the one or more LAN ports. In some instances, the method might further comprise implementing, with the network node, one or more network service headers ("NSH") in headers of data packets to route the one or more second VNFs to the one of the hypervisor or the container that is in communication with the first network access device.

According to some embodiments, the one of the hypervisor or the container that is in communication with the first network access device might be one of a roaming hypervisor associated with the first user, a roaming device with a container associated with the first user, a roamed-to hypervisor that is local to the first network access device and that is unassociated with the first user, or a roamed-to container that is local to the first network access device and that is unassociated with the first user. In some cases, providing the one or more second VNFs to the one of the hypervisor or the container might comprise one of pushing, with the network node, the one or more second VNFs to the one of the hypervisor or the container or enabling, with the network node, the one of the hypervisor or the container to pull the one or more second VNFs. In some instances, at least one of the one or more first VNFs and at least one of the one or more second VNFs are the same VNF.

Merely by way of example, in some embodiments, the method might further comprise, in response to determining that the first user is authorized to access one or more subscribed-to services that are accessible by the second network access device: determining, with the network node, whether implementation of the one or more subscribed-to services exceeds physical limitations of the first network access device; based on a determination that implementation of the one or more subscribed-to services is within capabilities of the first network access device, reconfiguring, with the network node, at least one of network configurations or network settings to provide the first user with the one or more subscribed-to services via the first network access device; and based on a determination that implementation of the one or more subscribed-to services exceeds physical limitations of the first network access device, reconfiguring, with the network node, at least one of network configurations or network settings to provide the first user with the one or more subscribed-to services via the first network access device, up to the limits of the first network access device. The method might further comprise, based on a determination that the first user device is no longer in communication with the first network access device (or with any network node in the second network), reverting, with the network node, the at least one of network configurations or network settings to previous configurations or settings. According to some embodiments, the method might further comprise, based on a determination that implementation of the one or more subscribed to services exceeds physical limitations of the first network access device, sending, with the network node, a notification to the user providing an indication of the physical limitations and providing the user with at least one of options or recommendations for actions to take to mitigate the physical limitations.

In another aspect, a network node might be located in a first network. The network node might comprise at least one processor and a non-transitory computer readable medium communicatively coupled to the at least one processor. The non-transitory computer readable medium might have stored thereon computer software comprising a set of instructions that, when executed by the at least one processor, causes the network node to receive, via a first network access device in a second network, a request from a first user device to establish roaming network access, a first user of the first user device being associated with a second network access device in the first network and being unassociated with the first network access device, the second network access device being located in a different geographical location from the first network access device; authenticate the first user, by determining whether the first user is associated with the second network access device and determining whether the first user is authorized to access at least one of data, content, profiles, software applications, one or more first virtual network functions ("VNFs"), or one or more subscribed-to services that are accessible by the second network access device; based on a determination that the first user is associated with the second network access device and that the first user is authorized to access at least one of data, content, profiles, software applications, one or more first VNFs, or one or more subscribed-to services that are accessible by the second network access device, provide one or more second VNFs to one of a hypervisor or a container that is in communication with the first network access device and executing instances of the one or more second VNFs on the one of the hypervisor or the container; and establish access connection to a data store by executing the instances of the one or more second VNFs on the one of the hypervisor or the container, the data store containing the at least one of data, content, profiles, software applications, one or more first VNFs, or network configuration information for one or more subscribed-to services that are accessible by the second network access device.

According to some embodiments, the network node might comprise one of a gateway device, a network switch, a network functions virtualization ("NFV") entity, or a software defined network ("SDN") controller, wherein the NFV entity comprises at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator, and/or the like.

In yet another aspect, a system might comprise a first network access device in a first network and a network node in a second network. The first network access device might comprise a first transceiver, at least one first processor, and a first non-transitory computer readable medium communicatively coupled to the at least one first processor. The first non-transitory computer readable medium might have stored thereon computer software comprising a first set of instructions that, when executed by the at least one first processor, causes the first network access device to receive, via the first transceiver, a request from a first user device to establish roaming network access, a first user of the first user device being associated with a second network access device in the second network and being unassociated with the first network access device, the second network access device being located in a different geographical location from the first network access device; and authenticate the first user, by sending, via the first transceiver, a request to the network node in the second network to authenticate the first user.

The network node might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the network node to receive, from the first network access device in the first network, the request from the first user device to establish roaming network access; authenticate the first user, by determining whether the first user is associated with the second network access device and determining whether the first user is authorized to access at least one of data, content, profiles, software applications, one or more first virtual network functions ("VNFs"), and/or subscribed-to services that are accessible by the second network access device; based on a determination that the first user is associated with the second network access device and that the first user is authorized to access at least one of data, content, profiles, software applications, one or more first VNFs, and/or subscribed-to services that are accessible by the second network access device, provide one or more second VNFs to one of a hypervisor or a container that is in communication with the first network access device and executing instances of the one or more second VNFs on the one of the hypervisor or the container; and establish access connection to a data store by executing the instances of the one or more second VNFs on the one of the hypervisor or the container, the data store containing the at least one of data, content, profiles, software applications, one or more first VNFs, or network configuration information for one or more subscribed-to services that are accessible by the second network access device.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-7 illustrate some of the features of the method, system, and apparatus for implementing network experience shifting, and, in particular embodiments, to methods, systems, apparatuses, and computer software for implementing network experience shifting using portable or external hypervisors (or containers) associated with a user, and, in other embodiments, to methods, systems, apparatuses, and computer software for implementing network experience shifting using hypervisors (or containers) that are unassociated with the user, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1 is a schematic diagram illustrating a system 100 for implementing network experience shifting, in accordance with various embodiments. In FIG. 1, system 100 might comprise a network node 105 that is located in a first network 110*a*, a first network access device 115 that is located in or is communicatively coupled to the first network 110*a*, and a second network access device 120 that is located in a second network 110*b* or is communicatively coupled to the second network 110*b*.

System 100 might further comprise one or more user devices 125, each of which might include, without limitation, one of a tablet computer 125*a*, a smart phone 125*b*, a mobile phone 125*c*, a portable gaming device 125*d*, a laptop computer 125*e*, a portable hypervisor (or container) 125*f*, a modem 125*g*, a radio device 125*h*, or a token chip device 125*i*, and/or the like. System 100 might also comprise a hypervisor (or container) 130, which might comprise a compute resource, a memory, and a storage, and/or the like. In some instances, the hypervisor (or container) 130 might be one of integrated with the second network access device 120, communicatively coupled to a host port of the second network access device 120, communicatively coupled to a universal serial bus ("USB") port of the second network access device 120, communicatively coupled to a local area network ("LAN") port of the second network access device 120, or communicatively coupled to a communication port of the second network access device 120 that is different from any of the host port, the USB port, and the LAN port, and/or the like, as shown in, and described in greater detail below with respect to, FIG. 2.

According to some embodiments, the network node 105 might include, without limitation, one of a gateway device, a network switch, a network functions virtualization ("NFV") entity 140-170, or a software defined network ("SDN") controller 135, wherein the NFV entity 140-170 might comprise at least one of a NFV resource manager, a network functions virtualization infrastructure ("NFVI") system 145, a NFV orchestrator 150, a NFV management and orchestration ("MANO") system 155, a virtual network function ("VNF") manager 160, a virtualized infrastructure manager ("VIM") 165, or some other NFV entity 170, which might include a virtual machine ("VM"), a macro orchestrator, or a domain orchestrator, and/or the like. In some cases, the first network 110*a* and the second network 110*b* might be associated with the same network service provider. Alternatively, the first network 110*a* and the second network 110*b* might be associated with different network service providers. In some cases, the first network 110*a* and the second network 110*b* might each communicatively couple to the Internet 110*c*. Each of the first network access device 115 and the second network access device 120, in some embodiments, might include, but is not limited to, at least one of a customer premises equipment ("CPE"), a router, a switch, a network element, a demarcation device, a WiFi gateway device, a hypervisor platform, one or more virtual machine-based host machines, and/or the like. The CPE, in some instances, might include, without limitation, at least one of an optical network terminal ("ONT"), a network interface device ("NID"), an enhanced NID ("eNID"), a residential gateway ("RG") device, a business gateway ("BG") device, or a virtual gateway ("vG") device, and/or the like.

In operation, a wireless (as depicted by the lightning bolt symbol in FIG. 1) and/or a wired connection (as depicted by the dashed line in FIG. 1) might be established between at least one user device 125 of the one or more user devices 125 and the second network access device 120. According to some embodiments, establishing a connection between the user device and the second network access device 120 might comprise establishing the connection between the user device and the second network access device 120 via a docking station (not shown) that is communicatively coupled to the second network access device 120. Alternatively, and/or additionally, the at least one user device 125 might send a request—in some cases, to the network node 105 or the like—to establish roaming network access via the second network access device 120 and via networks 110*a* and 110*b* (as shown by the dashed line extending from the one or more user devices 125, through the second network access device 120, to the network node 105), and, in some cases, where applicable, via a docking station that is communicatively coupled to the second network access device 120. The network node 105 might receive the request from the at least one user device 125, and might authenticate a user associated with the at least one user device 125. Authentication of the user might include at least one of the following: (a) determining whether the user is associated with the first network access device 115 and determining whether the user is authorized to access at least one of data, content, profiles, software applications (or "apps"), VNFs, and/or subscribed-to services that are accessible by the first network access device 115 (i.e., that are accessible by the user through or from the first network access device 115, or the like); (b) establishing a communication link between the hypervisor (i.e., a roaming or portable hypervisor that is associated with the user, the user being unassociated with the second network access device 120) (or the container) and the first network access device 115 via the network node 105 and authenticating the hypervisor using the first network access device 115, the network node 105, or both; (c) establishing a communication link (either via wired communication and/or via wireless communication) with a portal (e.g., a web portal or the like), sending authentication information to the portal from at least one of the user or the at least one user device 125, and authenticating, via the portal (i.e., either by the portal itself, a server running the portal, a server associated with the portal, and/or the like), the user based on the authentication information from the at least one of the user or the at least one user device 125.

In response to authenticating the user, the network node 105 might perform one or more of the following: (i) push one or more VNFs to the hypervisor 130 (which may be associated with the user (e.g., roaming hypervisor or the like) or may be unassociated with the user (e.g., roamed-to hypervisor or the like)) (or the container) that is in communication with the second network access device 120 and executing instances of the VNFs on the hypervisor 130 (alternatively, the user or hypervisor (or container) 130 might pull the one or more VNFs); (ii) establish a secure private LAN between the first network access device 115 and the second network access device 120 over the first and second networks 110*a* and 110*b*; (iii) establish an application programming interface ("API") over at least one of the first network or the second network and providing the API with access to hypervisor (or container) 130 that is communicatively coupled to the second network access device 120; (iv) establish one or more VXLANs over at least one of the first network or the second network, map the one or more VXLANs to hypervisor (or container) 130 that is communicatively coupled to at least one of one or more LAN ports of the second network access device 120, and map the one or more VXLANs to the one or more LAN ports of the second network access device 120; (v) use network service headers ("NSH"), which is agnostic to transport media and is compatible with various transport protocols or (e.g., VXLAN protocols, multiprotocol label switching ("MPLS") protocols, etc.), to route VNFs to the roamed-to hypervisor (or container) or to the portable hypervisor (or portable device with container); and/or the like.

In some embodiments, the request from the first user device might be automatically sent from the first user device via the first network access device, without user input from the first user. In such cases, the first user device and the first network access device might communicate with each other using at least one of machine-to-machine ("M2M") communication, M2M protocols, Internet of Things ("IoT") communication, IoT protocols, or IoT proxy functions, and/or the like. For example, the user might carry a token chip device when travelling to a different part of the country or to a different country on vacation or on a business trip. The token chip device might autonomously and automatically establish a wireless link to the local network access device (whether at a hotel, in a hotel room, at a business premises that may be associated with the user's employer or may be associated with a client or potential client, in a local coffee shop, in a local restaurant, etc.), and might automatically establish at least one of a secure private LAN, one or more VXLANS, and/or an API, to provide secure and private access to the user's data, content, profiles, apps, VNFs, and/or subscribed-to services to the user either via a local or roamed-to hypervisor (or container) that is communicatively coupled to the local network access device or via a roaming or portable hypervisor (or device with container) that the user also carries along. In alternative embodiments, the network node might push one or more VNFs to either the roamed-to hypervisor (or container) or the roaming hypervisor (or device with container), and might execute instances of the VNFs on such hypervisor (or container), to establish the at least one of a secure private LAN, one or more VXLANS, and/or an API, and/or to otherwise provide the user with secure and private access to the user's data, content, profiles, apps, VNFs, and/or subscribed-to services via such hypervisor (or container).

In another alternative set of embodiments, a VNF that simulates the functions of a hypervisor (referred to herein as "hypervisor VNF," which is distinct from other VNFs that can be executed on a hypervisor) might be pushed to a user device or a local network node/gateway, thereby enabling service portability over a roamed-to network even if the roamed-to network does not support hypervisors. In some instances, the hypervisor or hypervisor VNF could be located deeper in the roamed-to network than the access node (i.e., closer to the core of the network than the network access device, or the like). In many cases, being closer to the user device is better because of performance attributes like lower latency, or the like. Initially, however, some implementations may start out being hosted on centralized servers, then subsequently pushed closer to the customers (i.e., to the access networks, gateways, etc.) as economics and demand dictate. In still another alternative set of embodiments, the user can carry copies of VNFs with him or her when roaming to run on the portable hypervisor on his or her user device, or the user can tunnel back to his or her home LAN to retrieve or pull copies of VNFs, or the user can access a library (which may be located in various network locations, in cloud storage, or the like) that has copies of the VNFs that he or she has subscribed to and pull such VNFs.

According to another set of embodiments, the user may be able to access at least one of data, content, profiles, apps, VNFs, and/or services via the roamed-to hypervisor (or container), the roaming hypervisor (or roaming device with container), or a local network device running a pushed or pulled hypervisor VNF, or the like, using the techniques described herein. As to services being portable in this manner, an example might include a user plugging his or her user device into a port somewhere away from his or her home/work LAN (e.g., a port on a LAN in a neighbor's house, a port on a LAN hotel/motel/resort, a port on a LAN at a conference venue, a port on a public LAN, etc.). In the case of the neighbor's LAN being accessed, the neighbor may not subscribe to the same bandwidth or service level agreement. However, when the user device is attached or coupled to the neighbor's network, the user device can authenticate with an appropriate authentication server that will instruct the network to configure the access network to deliver the access service in accordance with the user's profile, subject to physical limitations of the access technology that the neighbor may have—e.g., the neighbor may be served by an xDSL technology that does not have the capability to provide the 1 Gbps service that the user may have subscribed to on a fiber network, etc. Depending on the user's SLA, there may be additional billing associated with reconfiguring the neighbor's network for the user. When the user removes his or her device from the neighbor's network, the network automatically reverts to the neighbor's access service profile. In a similar manner, public access networks (e.g., public LAN in a hotel/motel/resort, public LAN at a conference venue, other public LAN, etc.) can be reconfigured in like manner to provide the user with subscribed-to network service on the public-access network (subject to any physical limitations of the access technology of the public-access network). For such public LAN, reconfiguration of the network might also include establishing secure connections to turn the public LAN into a private LAN (e.g., VPN, etc.). When the user removes his or her device from the public access network, the network automatically reverts to its previous settings and configurations.

In the event that the roamed-to network is not capable of providing all the features and capabilities that the subscriber has subscribed to, the network may provide an indication of those limitations to the subscriber. This may be communicated through a web portal or other means of communication (including, but not limited to, e-mail, SMS, text message, etc.). A more advanced roamed-to system may also communicate options/recommendations on actions that the subscriber may be able to take in order to mitigate service deficiencies of the roamed-to network. For example, in the case of a bandwidth deficiency, the network may provide an option/recommendation for the subscriber to modify priority levels while connected to the roamed-to network. Another example might be to swap out a full-featured VNF requiring more resources for a reduced feature-set VNF that requires fewer resources (yet provides the subscriber with services up to the capability of the roamed-to network). Also, in addition to the services profile that the subscriber has, a contingency profile(s) might be provided that would contain sets of actions to take automatically should a deficiency be detected on the roamed-to network so that the subscriber does not have to manually execute those actions. Any changes from the original profile that get implemented based on a contingency profile(s) can be communicated to the subscriber by any appropriate means (e.g., web interface, e-mail, SNS, text message, etc.).

In the examples above, the user can be provided with access to his or her personalized network settings for his or her home network and/or for his or her work network—as well as access to his or her data, content, profiles, and/or software applications—, without doing anything (except, of course, carrying his or her user device and/or, in some cases, his or her portable hypervisor). Like in a cellular mobile network, a mobile or portable device (e.g., portable hypervisor, a device that has an integrated hypervisor, a device that has a detachable hypervisor, a device with a virtual hypervisor, a device with a container, or the like) a roam from one location to another without specific interaction with the user. If the mobile or portable device has previously visited a new network, the network may be able to partially or fully automate the authentication process, depending on the degree of secure identification information that is present.

Figure 2:
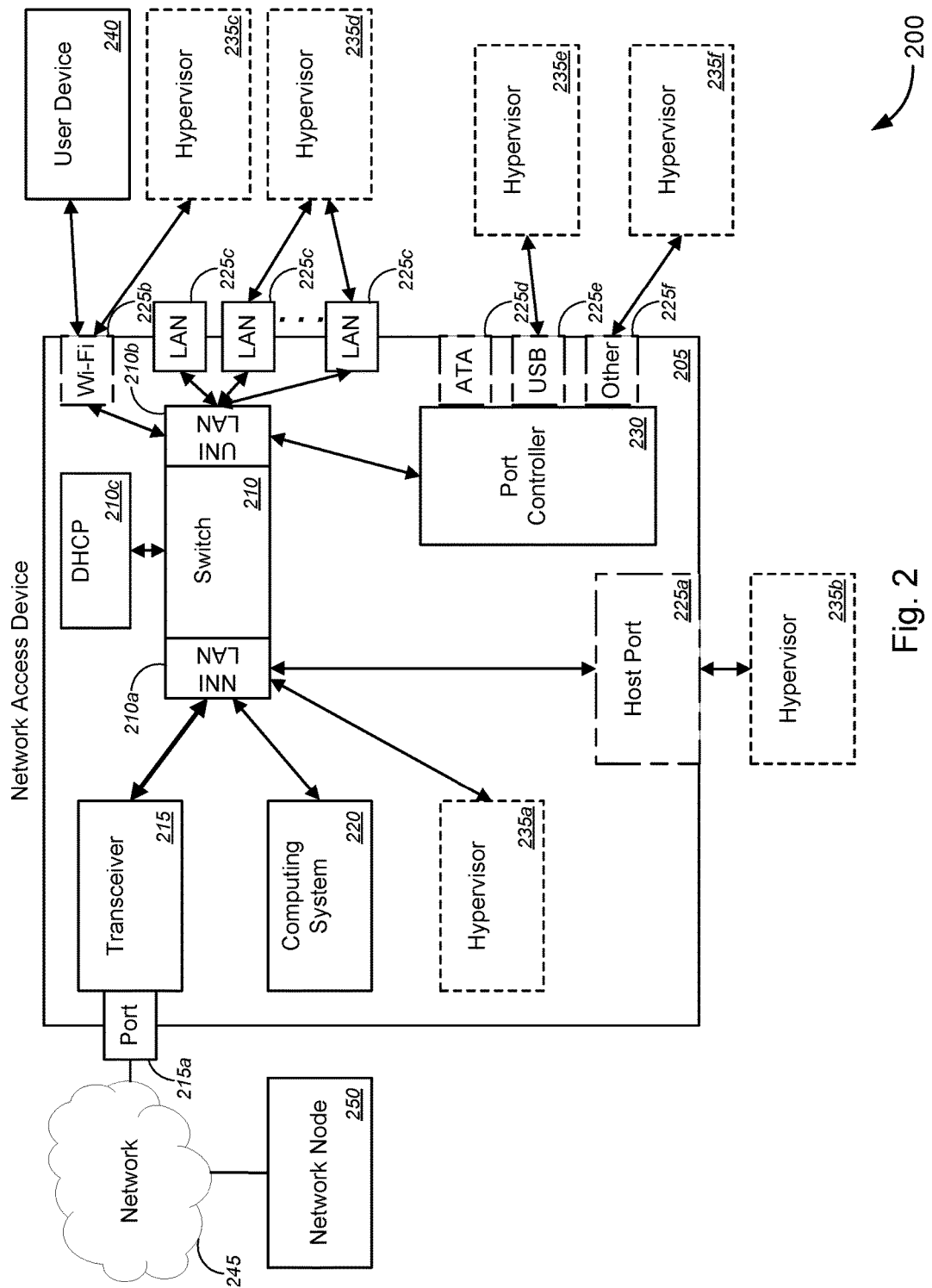
FIG. 2 is a schematic diagram illustrating an example network access device that can be used in a system for implementing network experience shifting, in accordance with various embodiments.

FIG. 2 is a schematic diagram illustrating an example network access device 205 that can be used in a system 200 for implementing network experience shifting, in accordance with various embodiments. In FIG. 2, system 200 might comprise a network access device 205, which might comprise a network switch 210, a transceiver 215, a computing system 220, one or more ports 225, and a port controller 230. The network access device 205 might include, but is not limited to, at least one of a customer premises equipment ("CPE"), a router, a switch, a network element, a demarcation device, a Wi-Fi gateway device, a hypervisor platform, one or more virtual machine-based host machines, and/or the like. The CPE, in some instances, might include, without limitation, at least one of an optical network terminal ("ONT"), a network interface device ("NID"), an enhanced NID ("eNID"), a residential gateway ("RG") device, a business gateway ("BG") device, or a virtual gateway ("vG") device, and/or the like.

The network switch 210, in some embodiments, might comprise a network-to-network interface ("NNI") or NNI LAN 210a, a user network interface ("UNI") or UNI LAN 210b, and a dynamic host configuration protocol ("DHCP") device 210c. According to some embodiments, the network switch 210 can be a physical switch or a virtual switch. In some cases, the network switch 210, as well as each of the NNI or NNI LAN 210a, the UNI or UNI LAN 210b, and the DHCP 210c, might be virtual components that utilize VNFs or the like to provide the network switch functionality, as well as the NNI or NNI LAN functionality, the UNI or UNI LAN functionality, and the DHCP functionality. In some embodiments, the transceiver 215 might comprise a network port 215a, which might provide physical port connections. In some cases, the transceiver 215 might be a virtual component that utilizes VNFs or the like to provide transceiver functionality. The plurality of ports 225, in some instances, might comprise at least one of a host port 225a, one or more Wi-Fi ports 225b, one or more LAN ports 225c, one or more advanced technology attachment ("ATA") ports 225d, one or more universal serial bus ("USB") ports 225e, one or more other ports 225f, and/or the like. In some cases, the one or more ATA ports 225d might each include, without limitation, a serial ATA ("SATA") port, an external SATA ("eSATA") port, a powered eSATA ("eSATAp") port, a mini SATA ("mSATA") port, a SATA Express port, and/or the like. The port controller 230, in some embodiments, might control the ATA ports 225d, the USB ports 225e, and/or the other ports 225f, or might otherwise serve as an interface between the UNI 210b of the network switch 210 and each of the ATA ports 225d, the USB ports 225e, and/or the other ports 225f. The NNI LAN 210a might communicatively couple each of the transceiver 215 and the computing system 220. According to some embodiments, the network access device 205 might be similar, if not identical to, the network enhanced gateway device as described in detail in each of the '688, '705, and the '711 applications, which have already been incorporated herein by reference.

System 200 might further comprise one or more hypervisors (or containers) 235, which might comprise a compute resource, a memory, and a storage, and/or the like. The one or more hypervisors (or containers) 235 might include, without limitation, one or more of an internal hypervisor (or container) 235a that is integrated with the network access device 205; an external, portable, and/or roaming hypervisor (or device with container) 235b that can communicatively couple to the host port 225a of the network access device 205; an external, portable, and/or roaming hypervisor (or device with container) 235c that can communicatively couple to the Wi-Fi port 225b of the network access device 205; an external, portable, and/or roaming hypervisor (or device with container) 235d that can communicatively couple to one or more LAN ports 225c of the network access device 205; an external, portable, and/or roaming hypervisor (or device with container) 235e that can communicatively couple to the USB port 225e of the network access device 205; and an external, portable, and/or roaming hypervisor (or device with container) 235f that can communicatively couple to the other port 225f of the network access device 205; and/or the like. In FIG. 2, the hypervisors 235 are shown as short dash line blocks to denote that the location or port connectivity of the hypervisors (or containers) 235 with respect to the network access device 205 can be any or a combination of the six options described above. According to some embodiments, the NNI LAN 210a might also communicatively couple to the internal hypervisor (or container) 235a and/or the hypervisor (or device with container) 235b via the host port 225a.

According to some embodiments, system 200 might further comprise user device 240, network 245, and network node 250. Although the user device 240 is shown in FIG. 2 as being communicatively coupled (in this case, wirelessly) to the Wi-Fi port 225b, the various embodiments are not so limited, and the user device 240 may be communicatively coupled to any of the host port 225a, one of the LAN ports 225c, the ATA port 225d, the USB port 225e, or the other port 225f, and/or the like. The network 245 (and the network node 250 via network 245) might communicatively couple to the transceiver 215 via port 215a.

In FIG. 2, the network access device 205, each of the one or more hypervisors (or containers) 235, the user device 240, the network 245, and the network node 250 of system 200 might correspond to the first or second network access device 115 or 120, the hypervisor (or container) 130, each of the one or more user devices 125, the network(s) 110a, 110b, and/or 110c, the network node 105, respectively, of system 100 of FIG. 1, and descriptions of these components similar apply to these components of system 200. The system 200 would otherwise function in the same or similar manner as system 100 of FIG. 1.

Figure 3:
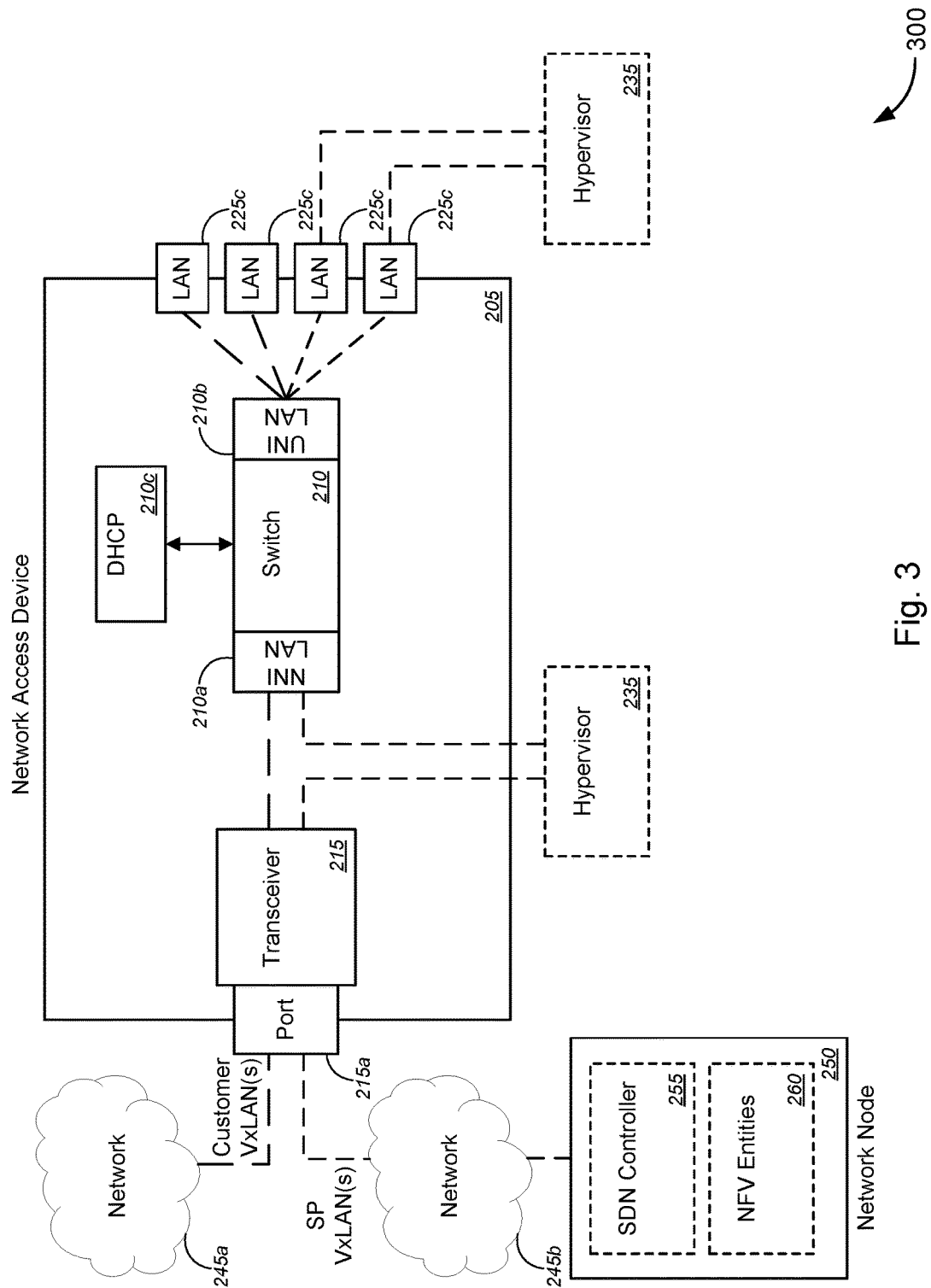
FIG. 3 is a schematic diagram illustrating another system for implementing network experience shifting, in accordance with various embodiments, depicting interconnections of with one or more customer virtual extensible local area networks ("VXLANs") and one or more service provider ("SP") VXLANs.

FIG. 3 is a schematic diagram illustrating another system 300 for implementing network experience shifting, in accordance with various embodiments, depicting interconnections of with one or more customer virtual extensible local area networks ("VXLANs") and one or more service provider ("SP") VXLANs.

In FIG. 3, system 300 might comprise network access device 205 and one or more hypervisors (or containers) 235. The network access device 205 might comprise network switch 210, transceiver 215, and a plurality of LAN ports 225c. Although only the plurality of LAN ports 225c are shown in FIG. 3, the various embodiments are not so limited, and the network access device 205 may comprise any of the ports 225 as described above with respect to FIG. 2, with the hypervisor (or device with container) 235 communicatively coupled to any one or more of the ports 225 of system 200 of FIG. 2. As in system 200, the network switch 210, in some embodiments, might comprise a network-to-network interface ("NNI") or NNI LAN 210a, a user network interface ("UNI") or UNI LAN 210b, and a dynamic host configuration protocol ("DHCP") device 210c. The transceiver 215 might comprise, as in system 200, network port 215a, which might provide physical port connections. System 300 might further comprise networks 245a and 245b, as well as network node 250. Network node 250 might, according to some embodiments, comprise an SDN controller 255 and one or more NFV entities 260.

In the embodiment of FIG. 3, system 300 might establish a service provider ("SP") VxLAN(s) (denoted by the dash line) that might span from network node 250, through network 245b, through port 215a, through transceiver 215, through hypervisor (or device with container) 235, through network switch 210 (and NNI LAN 210a and UNI LAN 210b), through LAN ports 225c, to hypervisor (or device with container) 235. In some cases, the system 300 might additionally establish a customer VxLAN(s) (denoted by the long dash line) that might span from network 245a, through port 215a, through transceiver 215, through network switch 210 (and NNI LAN 210a and UNI LAN 210b), to LAN ports 225c (and subsequently to any client or user devices that might communicatively couple to these particular LAN ports 225).

In FIG. 3, the network access device 205, each of the one or more hypervisors (or devices with containers) 235, the network 245a or 245b, the network node 250, the SDN controller 255, and the one or more NFV entities 260 of system 200 might correspond to the first or second network access device 115 or 120, the hypervisor (or container) 130, the network(s) 110a, 110b, and/or 110c, the network node 105, the SDN controller 135, the one or more NFV entities 140-170, respectively, of system 100 of FIG. 1, and descriptions of these components similar apply to these components of system 200. The system 200 would otherwise function in the same or similar manner as system 100 of FIG. 1. Likewise, the network access device 205, the network switch 210, the NNI LAN 210a, the UNI LAN 210b, the DHCP 210c, the transceiver 215, the port 215a, each of the ports 225c, each of the one or more hypervisors (or containers) 235, the network 245a or 245b, and the network node 250 of system 300 might correspond to the network access device 205, the network switch 210, the NNI LAN 210a, the UNI LAN 210b, the DHCP 210c, the transceiver 215, the port 215a, each of the ports 225c, each of the one or more hypervisors (or containers or devices with containers) 235a-235f, the network 245, and the network node 250 of system, respectively, of system 200 of FIG. 2, and descriptions of these components similar apply to these components of system 300. The system 300 would otherwise function in the same or similar manner as system 200 of FIG. 2.

Figure 4A:
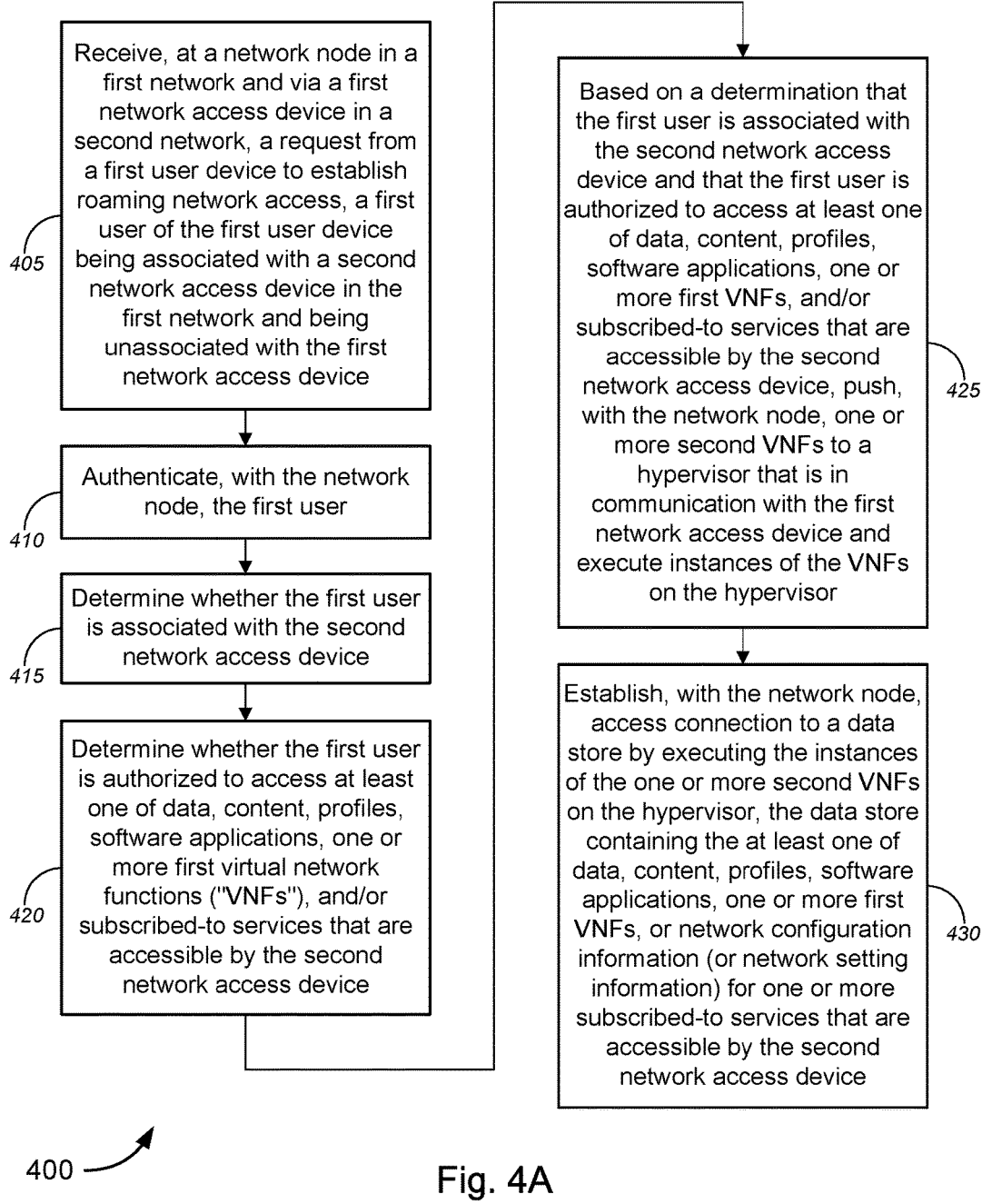
FIGS. 4A and 4B are flow diagrams illustrating a method for implementing network experience shifting, in accordance with various embodiments.
Figure 4B:
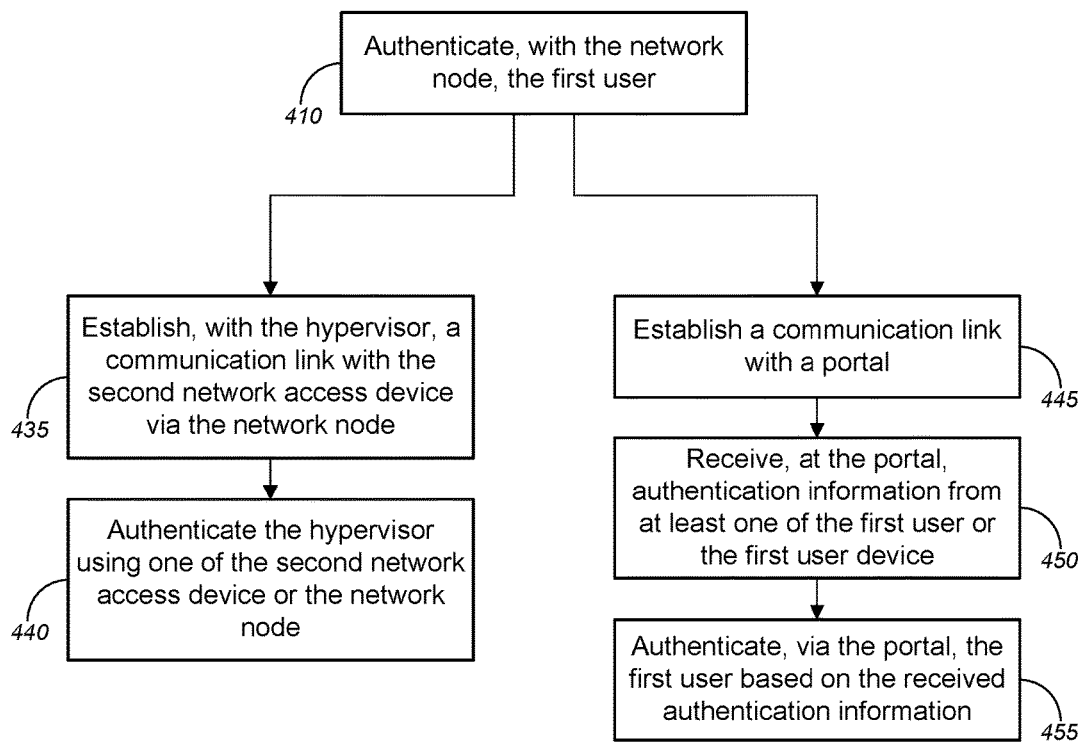

FIGS. 4A and 4B (collectively, "FIG. 4") are flow diagrams illustrating a method 400 for implementing network experience shifting, in accordance with various embodiments. FIG. 4A depicts a method for implementing network experience shifting, while FIG. 4B depicts various embodiments for authenticating the first user in the method of FIG. 4A.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems 100, 200, and 300 of FIGS. 1, 2, and 3, respectively (or components thereof), such methods may also be implemented using any suitable hardware (or software) implementation. Similarly, while each of the systems 100, 200, and 300 of FIGS. 1, 2, and 3, respectively (or components thereof), can operate according to the method 400 illustrated by FIG. 4 (e.g., by executing instructions embodied on a computer readable medium), the systems 100, 200, and 300 of FIGS. 1, 2, and 3 can each also operate according to other modes of operation and/or perform other suitable procedures.

In FIG. 4A, method 400 might comprise, at block 405, receiving, at a network node (e.g., network nodes 105 and 250 of FIGS. 1-3) in a first network (e.g., first network 110a of FIG. 1) and via a first network access device (e.g., second network access device 120 of FIG. 1 or network access device 205 in FIGS. 2 and 3) in a second network (e.g., second network 110b of FIG. 1), a request from a first user device (e.g., user devices 125 and 240 of FIGS. 1 and 2) to establish roaming network access. A first user of the first user device might be associated with a second network access device (e.g., first network access device 115 of FIG. 1) in the first network and might be unassociated with the first network access device. In some cases, the second network access device might be located in a different geographical location from the first network access device.

According to some embodiments, the network node might include, without limitation, one of a gateway device, a network switch, a network functions virtualization ("NFV") entity, or a software defined network ("SDN") controller, wherein the NFV entity comprises at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator, and/or the like. In some cases, the first network and the second network might be associated with the same network service provider. Alternatively, the first network and the second network might be associated with different network service providers. In some instances, the first user device might include, but is not limited to, one of a tablet computer, a smart phone, a mobile phone, a portable gaming device, a laptop computer, a portable hypervisor, a modem, a radio device, or a token chip device, and/or the like. The first network access device and the second network access device, in some embodiments, might each include, but is not limited to, at least one of a customer premises equipment ("CPE"), a router, a switch, a network element, a demarcation device, a WiFi gateway device, a hypervisor platform, one or more virtual machine-based host machines, and/or the like. The CPE, in some instances, might include, without limitation, at least one of an optical network terminal ("ONT"), a network interface device ("NID"), an enhanced NID ("eNID"), a residential gateway ("RG") device, a business gateway ("BG") device, or a virtual gateway ("vG") device, and/or the like.

In some embodiments, the request from the first user device might be automatically sent from the first user device via the first network access device, without user input from the first user. In such cases, the first user device and the first network access device might communicate with each other using at least one of machine-to-machine ("M2M") communication, M2M protocols, Internet of Things ("IoT") communication, IoT protocols, or IoT proxy functions, and/or the like. According to some embodiments, receiving the request from the first user device to establish roaming network access might comprise receiving, at the network node, the request from the first user device to establish roaming network access via the first network access device and via a docking station (not shown) that is communicatively coupled to the first network access device.

At block 410, method 400 might comprise authenticating, with the network node, the first user. FIG. 4B depicts various embodiments for authenticating the first user, as described in detail below.

Method 400 might further comprise determining, with the network node, whether the first user is associated with the second network access device (block 415) and determining, with the network node, whether the first user is authorized to access at least one of data, content, profiles, software applications, one or more first virtual network functions ("VNFs"), and/or subscribed-to services that are accessible by the second network access device (block 420).

Method 400 might further comprise, at block 425, based on a determination that the first user is associated with the second network access device and that the first user is authorized to access at least one of data, content, profiles, software applications, one or more first VNFs, and/or subscribed-to services that are accessible by the second network access device, providing, with the network node, one or more second VNFs to a hypervisor (or container) that is in communication with the first network access device and executing instances of the VNFs on the hypervisor (or container). In some cases, providing the one or more second VNFs to the hypervisor (or container) might comprise one of pushing, with the network node, the one or more second VNFs to the hypervisor (or container) or enabling, with the network node, the hypervisor (or container) to pull the one or more second VNFs.

At block 430, method 400 might further comprise establishing, with the network node, access connection to a data store by executing the instances of the one or more second VNFs on the hypervisor (or container), the data store containing the at least one of data, content, profiles, software applications, one or more first VNFs, or network configuration information (or network setting information) for one or more subscribed-to services that are accessible by the second network access device. In some cases, the data store might include, without limitation, at least one of one or more databases local to a home local area network ("LAN") that is associated with the first user, one or more databases local to a work LAN that is associated with the first user, one or more databases disposed within the network node, one or more databases external yet communicatively coupled to the network node, one or more databases communicatively coupled to a profile server, a data library, a content library, a profile library, a VNF library, or a configuration library, and/or the like.

For accessing subscribed-to services (e.g., broadband Internet connection at subscribed-to bandwidths or network speeds, subscribed-to network notifications, access to affiliate subscription web sites, access to other network services, etc.), in response to determining that the first user is authorized to access one or more subscribed-to services that are accessible by the second network access device, the method might further comprise determining, with the network node, whether implementation of the one or more subscribed-to services exceeds physical limitations of the first network access device; based on a determination that implementation of the one or more subscribed-to services is within capabilities of the first network access device, reconfiguring, with the network node, at least one of network configurations or network settings to provide the first user with the one or more subscribed-to services via the first network access device; and based on a determination that implementation of the one or more subscribed-to services exceeds physical limitations of the first network access device, reconfiguring, with the network node, at least one of network configurations or network settings to provide the first user with the one or more subscribed-to services via the first network access device, up to the limits of the first network access device. Based on a determination that the first user device is no longer in communication with the first network access device (e.g., after the user has disconnected his or her device from the first network access device and/or from the second network) the method might further comprise reverting, with the network node, the at least one of network configurations or network settings to previous configurations or settings (i.e., the network configurations or settings prior to reconfiguration to provide the first user with the one or more subscribed-to services via the first network access device).

In some instances, the hypervisor (or container) and the first user device might be associated with the first user and might be unassociated with the first network access device. According to some embodiments, the hypervisor (or container) and the first user device might be the same device and might be embodied as a roaming hypervisor (or device with container). In such cases, the one or more second VNFs that are pushed to the roaming hypervisor (or device with container) might be VNFs that are already subscribed to by the first user. In some cases, at least one of the one or more first VNFs and at least one of the one or more second VNFs might be the same; alternatively, the one or more first VNFs might be different from the one or more second VNFs (which might include a hypervisor VNF as described above). With reference to FIG. 4B, in some embodiments, authenticating the first user (at block 410) might comprise establishing, with the hypervisor (or container), a communication link with the second network access device via the network node (block 435) and authenticating the hypervisor (or container) using one of the second network access device or the network node (block 440).

In alternative embodiments, authenticating the first user (at block 410) might comprise establishing a communication link with a portal (block 445), receiving, at the portal, authentication information from at least one of the first user or the first user device (block 450), and authenticating, via the portal, the first user based on the received authentication information (block 455). According to some embodiments, authentication might involve an authentication server performing authentication processes. In some cases, authentication might include authenticating portions of a profile of the user.

In some cases, the hypervisor (or container) might comprise a compute resource, a memory, and a storage, and/or the like. In some instances, the hypervisor (or container) might be one of integrated with the first network access device, communicatively coupled to a host port of the first network access device, communicatively coupled to a universal serial bus ("USB") port of the first network access device, communicatively coupled to a local area network ("LAN") port of the first network access device, or communicatively coupled to a communication port of the first network access device that is different from any of the host port, the USB port, and the LAN port, and/or the like.

Figure 5A:
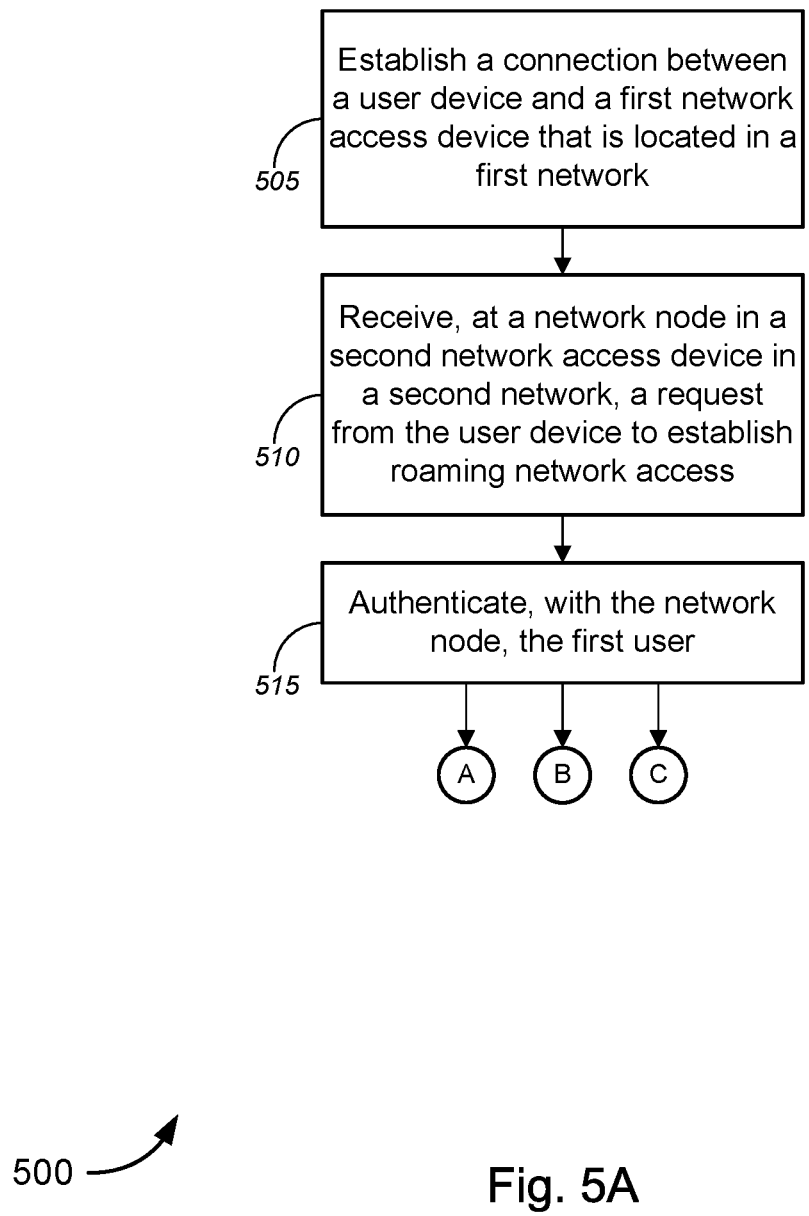

FIGS. 5A-5D (collectively, "FIG. 5") are flow diagrams illustrating various other methods 500 for implementing network experience shifting, in accordance with various embodiments. FIGS. 5A and 5B depict a method 500' for implementing network experience shifting, while FIGS. 5A and 5C depict an alternative method 500" for implementing network experience shifting, and FIGS. 5A and 5D depict yet another alternative method 500" for implementing network experience shifting, While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems 100, 200, and 300 of FIGS. 1, 2, and 3, respectively (or components thereof), such methods may also be implemented using any suitable hardware (or software) implementation. Similarly, while each of the systems 100, 200, and 300 of FIGS. 1, 2, and 3, respectively (or components thereof), can operate according to the method 500 illustrated by FIG. 5 (e.g., by executing instructions embodied on a computer readable medium), the systems 100, 200, and 300 of FIGS. 1, 2, and 3 can each also operate according to other modes of operation and/or perform other suitable procedures.

In FIG. 5A, method 500 might comprise establishing a connection between a user device and a first network access device that is located in a first network (block 505), receiving, at a network node in a second network access device in a second network, a request from the user device to establish roaming network access (block 510), and authenticating, with the network node, the first user (block 515).

According to some embodiments, the user device might correspond to user devices 125 and 240 of FIGS. 1 and 2 or the like, the first network access device might correspond to second network access device 120 of FIG. 1 or network access device 205 in FIGS. 2 and 3 or the like, the network node might correspond to network nodes 105 and 250 of FIGS. 1-3 or the like, and the first network might correspond to second network 110b of FIG. 1 or the like, while the second network access device might correspond to first network access device 115 of FIG. 1 or the like, and the second network might correspond to first network 110a of FIG. 1 or the like. In some cases, the user device might include, but is not limited to, one of a tablet computer, a smart phone, a mobile phone, a portable gaming device, a laptop computer, a portable hypervisor, a modem, a radio device, or a token chip device, and/or the like. The first network access device and the second network access device, in some embodiments, might each include, but is not limited to, at least one of a customer premises equipment ("CPE"), a router, a switch, a network element, a demarcation device, a WiFi gateway device, a hypervisor platform, one or more virtual machine-based host machines, and/or the like. The CPE, in some instances, might include, without limitation, at least one of an optical network terminal ("ONT"), a network interface device ("NID"), an enhanced NID ("eNID"), a residential gateway ("RG") device, a business gateway ("BG") device, or a virtual gateway ("vG") device, and/or the like.

In some cases, the network node might include, without limitation, one of a gateway device, a network switch, a network functions virtualization ("NFV") entity, or a software defined network ("SDN") controller, wherein the NFV entity comprises at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator, and/or the like. In some cases, the first network and the second network might be associated with the same network service provider. Alternatively, the first network and the second network might be associated with different network service providers.

According to some embodiments, establishing a connection between the user device and the first network access device might comprise establishing the connection between the user device and the first network access device via a docking station (not shown) that is communicatively coupled to the first network access device. Accordingly, receiving the request from the user device to establish roaming network access might comprise receiving, at the network node, the request from the first user device to establish roaming network access via the first network access device and via the docking station that is communicatively coupled to the first network access device. In some embodiments, establishing the connection between the user device and the first network access device comprises establishing a wireless connection between the user device and the first network access device. Alternatively, or additionally, establishing the connection between the user device and the first network access device comprises establishing a wired connection between the user device and the first network access device.

Method 500 might proceed to block 520 and method 500' of FIG. 5B following the circular marker denoted, "A," might proceed to block 525 and method 500" of FIG. 5C following the circular marker denoted, "B," and/or might proceed to block 535 and method 500" of FIG. 5D following the circular marker denoted, "C."

Turning to FIG. 5B, after authentication of the first user (at block 515), method 500' might comprise, at block 520, establishing, with the network node, a secure private LAN between the first network access device and the second network access device over the first network and the second network.

With reference to FIG. 5C, after authentication of the first user (at block 515), method 500" might comprise establishing, with the network node, an application programming interface ("API") over at least one of the first network or the second network (optional block 525) and providing, with the network node, the API with access to a hypervisor (or container) that is communicatively coupled to the first network access device (block 530). In some embodiments, the hypervisor (or container) might comprise a compute resource, a memory, and a storage, and/or the like. In some instances, the hypervisor (or container) might be one of integrated with the first network access device, communicatively coupled to a host port of the first network access device, communicatively coupled to a universal serial bus ("USB") port of the first network access device, communicatively coupled to a local area network ("LAN") port of the first network access device, or communicatively coupled to a communication port of the first network access device that is different from any of the host port, the USB port, and the LAN port, and/or the like. In some instances, the hypervisor (or container) and the first user device might be associated with the first user and might be unassociated with the first network access device. According to some embodiments, the hypervisor (or container) and the first user device might be the same device and might be embodied as a roaming hypervisor (or device with container).

In FIG. 5D, after authentication of the first user (at block 515), method 500" might comprise establishing, with the network node, one or more virtual extensible local area networks ("VXLANs") over at least one of the first network or the second network (optional block 535), mapping the one or more VXLANs to one or more LAN ports of the first network access device (block 540), and mapping, with the network node, the one or more VXLANs to a hypervisor that is communicatively coupled to at least one of the one or more LAN ports of the first network access device (block 545).

Exemplary System and Hardware Implementation

Figure 6:
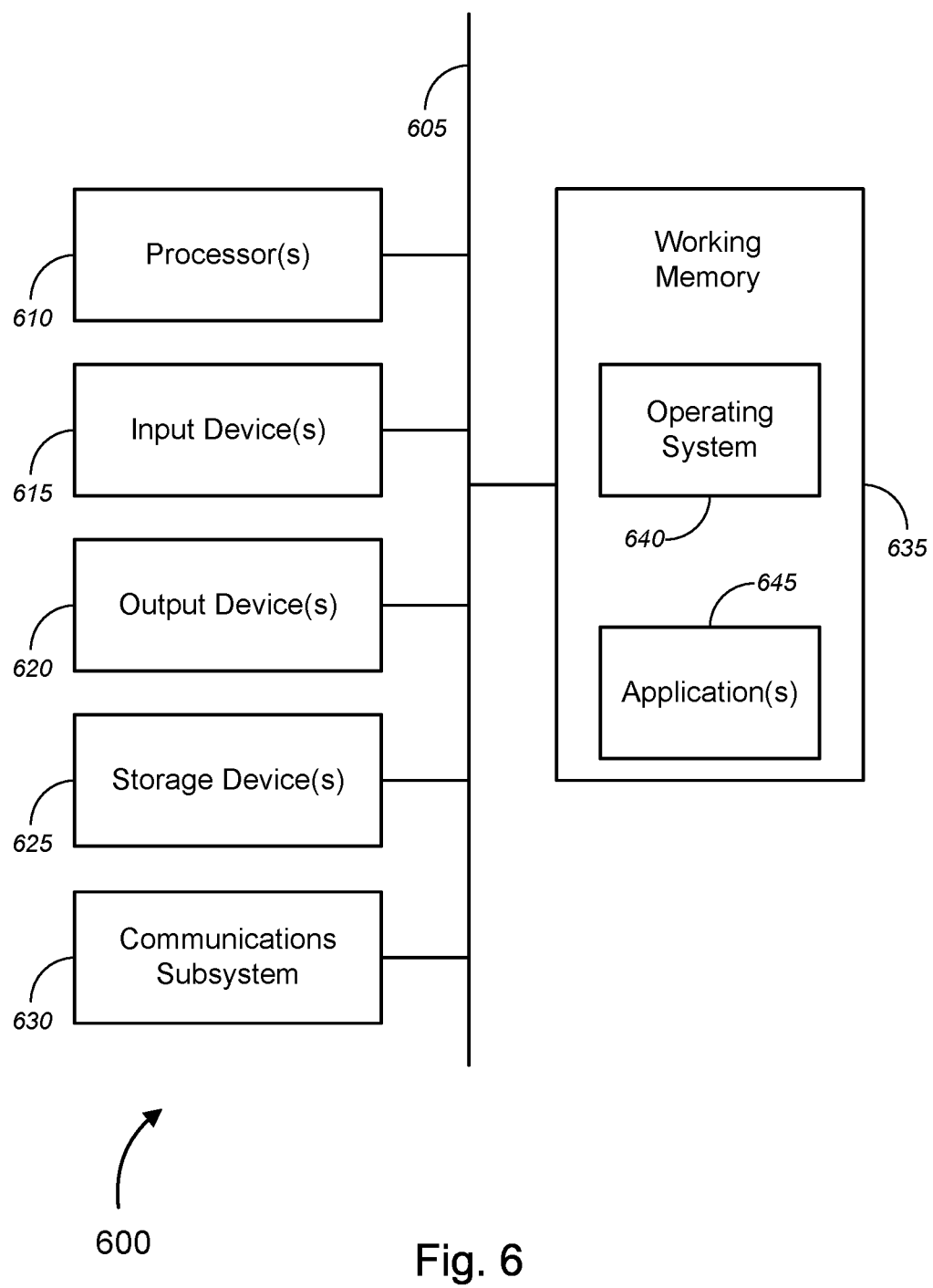
FIG. 6 is a block diagram illustrating an exemplary computer or system hardware architecture, in accordance with various embodiments.

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of computer or hardware system (i.e., network nodes 105 and 250, network access devices 115, 120, and 205, user devices 125 and 240, hypervisors (or containers) 130, 235a-f, and 235, software defined network ("SDN") controllers 135 and 255, network functions virtualization ("NFV") entities (including, but not limited to, NFV resource manager 140, NFV Infrastructure ("NFVI") system 145, NFV orchestrator 150, NFV management and orchestration ("MANO") architectural framework or system 155, virtual network function ("VNF") manager 160, virtual infrastructure manager ("VIM") 165, other NFV entities 170, NFV entities 260, and/or the like), etc.), as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer or hardware system 600—which might represent an embodiment of the computer or hardware system (i.e., network nodes 105 and 250, network access devices 115, 120, and 205, user devices 125 and 240, hypervisors (or containers) 130, 235a-f, and 235, SDN controllers 135 and 255, NFV entities (including, but not limited to, NFV resource manager 140, NFVI system 145, NFV orchestrator 150, NFV MANO architectural framework or system 155, VNF manager 160, VIM 165, other NFV entities 170, NFV entities 260, and/or the like), etc.), described above with respect to FIGS. 1-3—is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and/or the like); one or more input devices 615, which can include, without limitation, a mouse, a keyboard, and/or the like; and one or more output devices 620, which can include, without limitation, a display device, a printer, and/or the like.

The computer or hardware system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 630 may permit data to be exchanged with a network (such as the network described below, to name one example), with other computer or hardware systems, and/or with any other devices described herein. In many embodiments, the computer or hardware system 600 will further comprise a working memory 635, which can include a RAM or ROM device, as described above.

The computer or hardware system 600 also may comprise software elements, shown as being currently located within the working memory 635, including an operating system 640, device drivers, executable libraries, and/or other code, such as one or more application programs 645, which may comprise computer programs provided by various embodiments (including, without limitation, hypervisors, VMs, containers, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
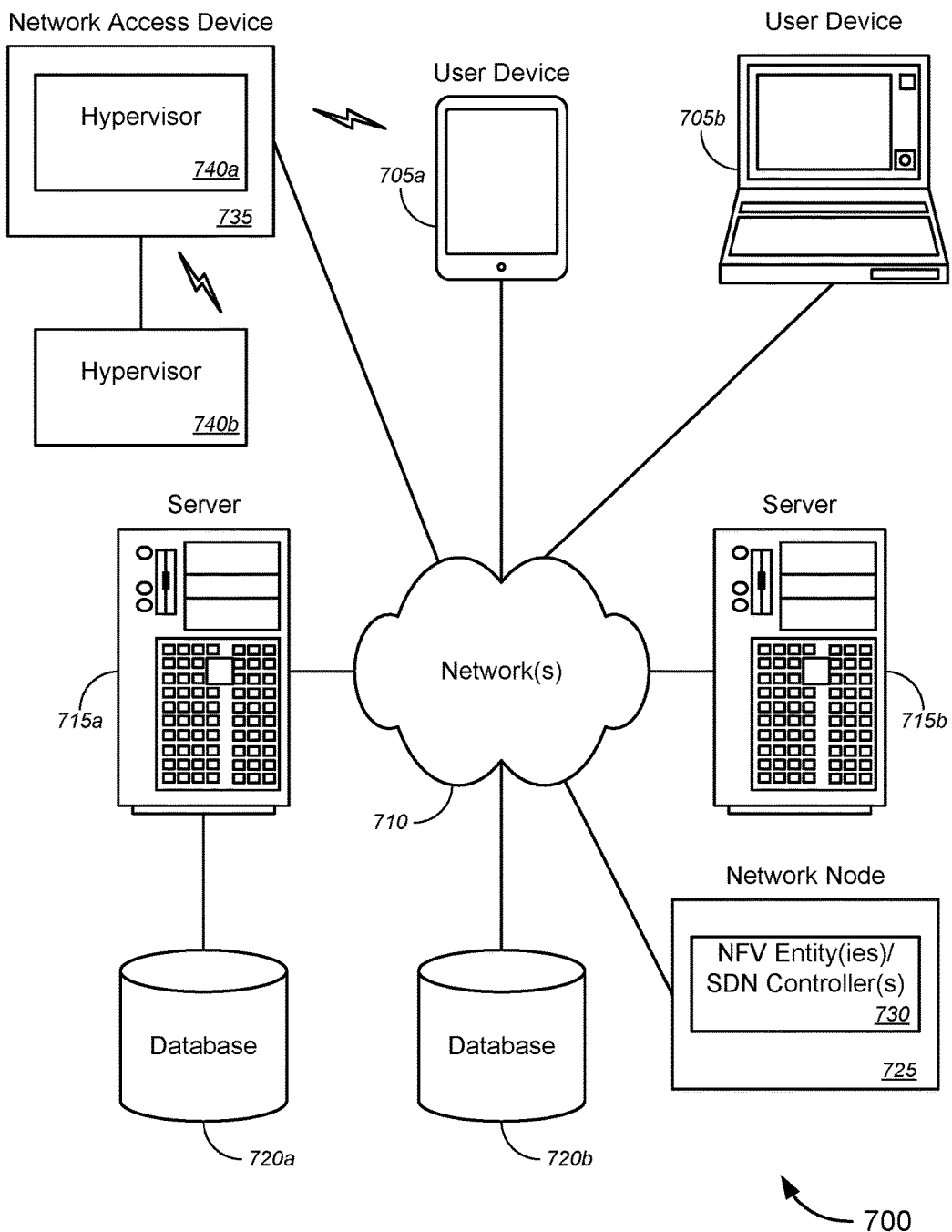
FIG. 7 is a block diagram illustrating a networked system of computers, computing systems, or system hardware architecture, which can be used in accordance with various embodiments.

As noted above, a set of embodiments comprises methods and systems for implementing network experience shifting, and, in particular embodiments, to methods, systems, apparatuses, and computer software for implementing network experience shifting using portable or external hypervisors (or devices with containers) associated with a user, and, in other embodiments, to methods, systems, apparatuses, and computer software for implementing network experience shifting using hypervisors (or containers) that are unassociated with the user. FIG. 7 illustrates a schematic diagram of a system 700 that can be used in accordance with one set of embodiments. The system 700 can include one or more user computers, user devices, or customer devices 705. A user computer, user device, or customer device 705 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 705 can also have any of a variety of applications, including one or more applications configured to perform methods provided by various embodiments (as described above, for example), as well as one or more office applications, database client and/or server applications, and/or web browser applications. Alternatively, a user computer, user device, or customer device 705 can be any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user computers, user devices, or customer devices 705, any number of user computers, user devices, or customer devices can be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 710 (similar to network 110*a*, 110*b*, and/or 110*c*, 245, 245*a*, or 245*b* of FIGS. 1-3, respectively, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing network experience shifting, and, in particular embodiments, to methods, systems, apparatuses, and computer software for implementing network experience shifting using portable or external hypervisors (or devices with containers) associated with a user, and, in other embodiments, to methods, systems, apparatuses, and computer software for implementing network experience shifting using hypervisors (or containers) that are unassociated with the user, or the like, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a and 720b (collectively, "databases 720"). The location of each of the databases 720 is discretionary: merely by way of example, a database 720a might reside on a storage medium local to (and/or resident in) a server 715a (and/or a user computer, user device, or customer device 705). Alternatively, a database 720b can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

According to some embodiments, system 700 might further comprise a network node 725 (similar to network node 105 or 250 of FIGS. 1-3, or the like). Network node 725 might comprise one or more NFV entities 730 and/or one or more SDN controllers 730. In some cases, the one or more NFV entities 730 might include, without limitation, one or more of a NFV resource manager (e.g., NFV resource manage 140 of FIG. 1, or the like), a NFVI system (e.g., NFVI system 145 of FIG. 1, or the like), a NFV orchestrator (e.g., NFV orchestrator 150 of FIG. 1, or the like), a NFV MANO architectural framework or system (e.g., NFV MANO architectural framework or system 155 of FIG. 1, or the like), a VNF manager (e.g., VNF manager 160 of FIG. 1, or the like), a VIM (e.g., VIM 165 of FIG. 1, or the like), other NFV entities (e.g., other NFV entities 170 of FIG. 1, or the like), a NFV entity (e.g., NFV entities 260 of FIG. 3, or the like), and/or the like). In some embodiments, system 700 might further comprise a network access device 735 (similar to network access device 115, 120, or 205 of FIG. 103, or the like). In some instances, the network access device 735 might comprise an internal hypervisor (or container) 740a (similar to internal hypervisor (or container) 235a of FIG. 2). Alternatively, or additionally, the network access device 735 might communicatively couple (either via wired connection or wireless connection (as indicated by the lightning bolt symbol)) with an external hypervisor (or container) 740b (similar to external hypervisor (or container) 235b-235f of FIG. 2), which might be coupled via one or more ports (e.g., host ports, Wi-Fi ports, LAN ports, USB ports, and/or other ports, similar to ports 225a-225f of FIG. 2). The network access device 735 might also communicatively couple with one or more of the user devices 705, either via wired connection or wireless connection (as indicated by the lightning bolt symbol).

In operation, one of the user devices 705 might communicatively couple to the network access device 735 (which, in some cases, might be associated with a user that is associated with the user device 705, while, in other cases, might be unassociated with the user (e.g., in the case that the user is travelling and communicatively couples with the local network access device at the destination)). In some cases, the user might request roaming network access by manually inputting instructions. Alternatively, the user device(s) 705 might automatically and autonomously send a request for roaming network access upon automatic communication via the network access device 735. The network node 725 might receive such request, and might authenticate the user (e.g., via the methods as described in detail with respect to FIGS. 4 and 5 above), and, in response to the user being authenticated, might perform at least one of the following: (a) push one or more VNFs to one or more of the hypervisors (or containers) 740a and/or 740b and execute instances of the VNFs on the one or more hypervisors (or containers); (b) establish a secure private LAN between the network access device 735 and the user's home or work network access device (similar to the first network access device 115 of FIG. 1); (c) provide an application programming interface ("API") with access to one or more of the hypervisors (or containers) 740a and/or 740b; (d) map one or more virtual extensible local area networks ("VXLANs") to one or more LAN ports of the network access device 735 and map the one or more VXLANs to hypervisor (or container) 740b that is communicatively coupled to at least one of the one or more LAN ports; and/or the like.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, at a network node in a first network and via a first network access device in a second network, a request from a first user device to establish roaming network access, a first user of the first user device being associated with a second network access device in the first network and being unassociated with the first network access device, the second network access device being located in a different geographical location from the first network access device;
   authenticating, with the network node, the first user;
   determining, with the network node, whether the first user is associated with the second network access device;
   determining, with the network node, whether the first user is authorized to access at least one of data, content, profiles, software applications, one or more first virtual network functions ("VNFs"), or one or more subscribed-to services that are accessible by the second network access device;
   based on a determination that the first user is associated with the second network access device and that the first user is authorized to access at least one of data, content, profiles, software applications, one or more first VNFs, or one or more subscribed-to services that are accessible by the second network access device, providing, with the network node, one or more second VNFs to one of a hypervisor or a container that is in communication with the first network access device and executing instances of the one or more second VNFs on the one of the hypervisor or the container; and
   establishing, with the network node, access connection to a data store by executing the instances of the one or more second VNFs on the one of the hypervisor of the container, the data store containing the at least one of data, content, profiles, software applications, one or more first VNFs, or network configuration information for one or more subscribed-to services that are accessible by the second network access device.

2. The method of claim 1, wherein the data store comprises at least one of one or more databases local to a home local area network ("LAN") that is associated with the first user, one or more databases local to a work LAN that is associated with the first user, one or more databases disposed within the network node, one or more databases external yet communicatively coupled to the network node, one or more databases communicatively coupled to a profile server, a data library, a content library, a profile library, a contingency profile library, a VNF library, or a network configuration library.

3. The method of claim 1, wherein the network node comprises one of a gateway device, a network switch, a network functions virtualization ("NFV") entity, or a software defined network ("SDN") controller, wherein the NFV entity comprises at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator.

4. The method of claim 1, wherein the first network and the second network are associated with the same network service provider.

5. The method of claim 1, wherein the first network and the second network are associated with different network service providers.

6. The method of claim 1, wherein the first user device and the one of the hypervisor or the container are associated with the first user and unassociated with the first network access device or any network nodes in the second network.

7. The method of claim 6, wherein the one of the hypervisor or the container comprises a hypervisor, wherein the hypervisor and the first user device are the same device, and are embodied as a roaming hypervisor, wherein the one or more second VNFs that are provided to the roaming hypervisor are VNFs that are already subscribed to by the first user.

8. The method of claim 6, wherein the one of the hypervisor or the container comprises a container, wherein the container is embodied as a roaming device with the container, wherein the roaming device and the first user device are the same device, wherein the one or more second VNFs that are provided to the roaming device are VNFs that are already subscribed to by the first user.

9. The method of claim 6, wherein authenticating, with the network node, the first user comprises:
establishing, with the one of the hypervisor or the container, a communication link with the second network access device via the network node; and
authenticating the one of the hypervisor or the container using one of the second network access device or the network node.

10. The method of claim 1, wherein authenticating, with the network node, the first user comprises:
establishing a communication link with a portal;
receiving, at the portal, authentication information from at least one of the first user or the first user device; and
authenticating, via the portal, the first user based on the received authentication information.

11. The method of claim 1, wherein the one of the hypervisor or the container comprises a compute resource, a memory, and a storage.

12. The method of claim 1, wherein the one of the hypervisor or the container is one of integrated with the first network access device, communicatively coupled to a host port of the first network access device, communicatively coupled to a universal serial bus ("USB") port of the first network access device, communicatively coupled to a local area network ("LAN") port of the first network access device, or communicatively coupled to a communication port of the first network access device that is different from any of the host port, the USB port, and the LAN port.

13. The method of claim 1, wherein the first user device comprises one of a tablet computer, a smart phone, a mobile phone, a portable gaming device, a laptop computer, a portable hypervisor, a roaming device with a container, a modem, a radio device, or a token chip device.

14. The method of claim 1, wherein the first network access device and the second network access device each comprises at least one of a customer premises equipment ("CPE"), a router, a switch, a network element, a demarcation device, a WiFi gateway device, a hypervisor platform, one or more virtual machine-based host machines, or a network node capable of hosting a hypervisor or a container.

15. The method of claim 14, wherein the CPE comprises at least one of an optical network terminal ("ONT"), a network interface device ("NID"), an enhanced NID ("eNID"), a residential gateway ("RG") device, a business gateway ("BG") device, a virtual gateway ("vG") device, an integrated cable modem/gateway, an integrated radio/gateway, or an integrated transceiver gateway device.

16. The method of claim 1, wherein the request from the first user device is automatically sent from the first user device via the first network access device, without user input from the first user.

17. The method of claim 16, wherein the first user device and the first network access device communicate with each other using at least one of machine-to-machine ("M2M") communication, M2M protocols, Internet of Things ("IoT") communication, IoT protocols, or IoT proxy functions.

18. The method of claim 1, wherein receiving the request from the first user device to establish roaming network access comprises receiving, at the network node, the request from the first user device to establish roaming network access via the first network access device and via a docking station that is communicatively coupled to the first network access device.

19. The method of claim 1, further comprising:
based on a determination that the first user is associated with the second network access device and that the first user is authorized to access at least one of data, content, profiles, software applications, one or more first VNFs, or one or more subscribed-to services that are accessible by the second network access device, establishing, with the network node, a secure private LAN between the first network access device and the second network access device over the first network and the second network.

20. The method of claim 1, further comprising:
providing, with the network node, an application programming interface ("API") with access to the one of the hypervisor or the container over the at least one of the first network or the second network.

21. The method of claim 1, further comprising:
mapping, with the network node, one or more virtual extensible local area networks ("VXLANs") to the one of the hypervisor or the container.

22. The method of claim 21, wherein mapping one or more VXLANs to the one of the hypervisor or the container comprises mapping one or more VXLANs to one or more LAN ports of the first network access device, wherein the one of the hypervisor or the container is communicatively coupled to at least one of the one or more LAN ports.

23. The method of claim 1, further comprising:
implementing, with the network node, one or more network service headers ("NSH") in headers of data packets to route the one or more second VNFs to the one of the hypervisor or the container that is in communication with the first network access device.

24. The method of claim 1, wherein the one of the hypervisor or the container that is in communication with the first network access device is one of a roaming hypervisor associated with the first user, a roaming device with a container associated with the first user, a roamed-to hypervisor that is local to the first network access device and that is unassociated with the first user, or a roamed-to container that is local to the first network access device and that is unassociated with the first user.

25. The method of claim 1, wherein providing the one or more second VNFs to the one of the hypervisor or the container comprises one of pushing, with the network node, the one or more second VNFs to the one of the hypervisor or the container or enabling, with the network node, the one of the hypervisor or the container to pull the one or more second VNFs.

26. The method of claim 1, wherein at least one of the one or more first VNFs and at least one of the one or more second VNFs are the same VNF.

27. The method of claim 1, further comprising, in response to determining that the first user is authorized to access one or more subscribed-to services that are accessible by the second network access device:
determining, with the network node, whether implementation of the one or more subscribed-to services exceeds physical limitations of the first network access device;
based on a determination that implementation of the one or more subscribed-to services is within capabilities of the first network access device, reconfiguring, with the network node, at least one of network configurations or network settings to provide the first user with the one or more subscribed-to services via the first network access device; and
based on a determination that implementation of the one or more subscribed-to services exceeds physical limitations of the first network access device, reconfiguring, with the network node, at least one of network configurations or network settings to provide the first user with the one or more subscribed-to services via the first network access device, up to the limits of the first network access device.

28. The method of claim 27, further comprising:
based on a determination that the first user device is no longer in communication with the first network access device, reverting, with the network node, the at least one of network configurations or network settings to previous configurations or settings.

29. The method of claim 27, further comprising:
based on a determination that implementation of the one or more subscribed-to services exceeds physical limitations of the first network access device, sending, with the network node, a notification to the user providing an indication of the physical limitations and providing the user with at least one of options or recommendations for actions to take to mitigate the physical limitations.

30. A network node in a first network, comprising:
at least one processor; and
a non-transitory computer readable medium communicatively coupled to the at least one processor, the non-transitory computer readable medium having stored thereon computer software comprising a set of instructions that, when executed by the at least one processor, causes the network node to:
receive, via a first network access device in a second network, a request from a first user device to establish roaming network access, a first user of the first user device being associated with a second network access device in the first network and being unassociated with the first network access device, the second network access device being located in a different geographical location from the first network access device;
authenticate the first user, by determining whether the first user is associated with the second network access device and determining whether the first user is authorized to access at least one of data, content, profiles, software applications, one or more first virtual network functions ("VNFs"), or one or more subscribed-to services that are accessible by the second network access device;
based on a determination that the first user is associated with the second network access device and that the first user is authorized to access at least one of data, content, profiles, software applications, one or more first VNFs, or one or more subscribed-to services that are accessible by the second network access device, provide one or more second VNFs to one of a hypervisor or a container that is in communication with the first network access device and executing instances of the one or more second VNFs on the one of the hypervisor or the container; and
establish access connection to a data store by executing the instances of the one or more second VNFs on the one of the hypervisor or the container, the data store containing the at least one of data, content, profiles, software applications, one or more first VNFs, or network configuration information for one or more subscribed-to services that are accessible by the second network access device.

31. The network node of claim 30, wherein the network node comprises one of a gateway device, a network switch, a network functions virtualization ("NFV") entity, or a software defined network ("SDN") controller, wherein the NFV entity comprises at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator.

32. A system, comprising:
a first network access device in a first network, comprising:
a first transceiver;
at least one first processor; and
a first non-transitory computer readable medium communicatively coupled to the at least one first processor, the first non-transitory computer readable medium having stored thereon computer software comprising a first set of instructions that, when executed by the at least one first processor, causes the first network access device to:
receive, via the first transceiver, a request from a first user device to establish roaming network access, a first user of the first user device being associated with a second network access device in a second network and being unassociated with the first network access device, the second network access device being located in a different geographical location from the first network access device; and
authenticate the first user, by sending, via the first transceiver, a request to a network node in the second network to authenticate the first user; and
the network node, comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the network node to:
receive, from the first network access device in the first network, the request from the first user device to establish roaming network access;
authenticate the first user, by determining whether the first user is associated with the second network access device and determining whether the first user is authorized to access at least one of data, content, profiles, software applications, one or more first virtual network functions ("VNFs"), or one or more subscribed-to services that are accessible by the second network access device;

based on a determination that the first user is associated with the second network access device and that the first user is authorized to access at least one of data, content, profiles, software applications, one or more first virtual network functions ("VNFs"), or one or more subscribed-to services that are accessible by the second network access device, provide one or more second VNFs to one of a hypervisor or a container that is in communication with the first network access device and executing instances of the VNFs on the one of the hypervisor or the container; and establish access connection to a data store by executing the instances of the one or more second VNFs on the one of the hypervisor or the container, the data store containing the at least one of data, content, profiles, software applications, one or more first VNFs, or network configuration information for one or more subscribed-to services that are accessible by the second network access device.

* * * * *